United States Patent
He et al.

(10) Patent No.: US 10,284,874 B2
(45) Date of Patent: *May 7, 2019

(54) METHODS AND SYSTEMS FOR INTRA BLOCK COPY CODING WITH BLOCK VECTOR DERIVATION

(71) Applicant: Vid Scale Inc., Wilmington, DE (US)

(72) Inventors: Yuwen He, San Diego, CA (US); Yan Ye, San Diego, CA (US); Xiaoyu Xiu, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,885

(22) Filed: Jan. 19, 2018

(65) Prior Publication Data
US 2018/0160141 A1 Jun. 7, 2018

Related U.S. Application Data

(63) Continuation of application No. 14/743,657, filed on Jun. 18, 2015, now Pat. No. 9,877,043.
(Continued)

(51) Int. Cl.
*H04N 19/513* (2014.01)
*H04N 19/70* (2014.01)
(Continued)

(52) U.S. Cl.
CPC ......... *H04N 19/521* (2014.11); *H04N 19/147* (2014.11); *H04N 19/186* (2014.11);
(Continued)

(58) Field of Classification Search
CPC .................................................. H04N 19/521
(Continued)

(56) References Cited

U.S. PATENT DOCUMENTS

2008/0240248 A1* 10/2008 Lee ............... H04N 7/26872
375/240.16
2012/0269268 A1* 10/2012 Kim ................... H04N 19/56
19/56
(Continued)

OTHER PUBLICATIONS

Xu X et al: "Simplification on block vector prediction for intra block copy", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,,No. JCTVC-Q0127, Mar. 18, 2014 (Mar. 18, 2014), XP030116054, par. [0002], par. [8.4.4].
(Continued)

*Primary Examiner* — Jason C Olson
(74) *Attorney, Agent, or Firm* — Invention Mine LLC

(57) ABSTRACT

Systems and methods are described for encoding and decoding video using derived block vectors as predictors in intra block copy mode. In an exemplary encoding method, an encoder identifies at least a first candidate block vector for the prediction of an input video block, where the first candidate block vector points to a first candidate block. The encoder then identifies a first predictive vector (e.g. a block vector or a motion vector) that was used to encode the first candidate block. From the first candidate block vector and the first predictive vector, the encoder generates a derived predictive vector from the first candidate block vector and the first predictive vector. The encoder then encodes the video block in the bit stream using the derived predictive vector for the prediction of the input video block.

26 Claims, 12 Drawing Sheets

Related U.S. Application Data

(60) Provisional application No. 62/014,664, filed on Jun. 19, 2014.

(51) Int. Cl.

| | | |
|---|---|---|
| *H04N 19/147* | (2014.01) | |
| *H04N 19/593* | (2014.01) | |
| *H04N 19/463* | (2014.01) | |
| *H04N 19/186* | (2014.01) | |
| *H04N 19/90* | (2014.01) | |
| *H04N 19/94* | (2014.01) | |

(52) U.S. Cl.
CPC ......... *H04N 19/463* (2014.11); *H04N 19/593* (2014.11); *H04N 19/70* (2014.11); *H04N 19/90* (2014.11); *H04N 19/94* (2014.11)

(58) Field of Classification Search
USPC .................................................. 375/240.16
See application file for complete search history.

(56) References Cited

U.S. PATENT DOCUMENTS

| | | |
|---|---|---|
| 2012/0320984 A1 | 12/2012 | Zhou |
| 2013/0294512 A1 | 11/2013 | Song |
| 2014/0050265 A1 | 2/2014 | Joshi |
| 2014/0211851 A1* | 7/2014 | Miyoshi .................. H04N 19/52 375/240.15 |
| 2014/0254686 A1* | 9/2014 | Lim ........................ H04N 19/52 375/240.16 |
| 2014/0376634 A1 | 12/2014 | Guo |
| 2015/0195559 A1 | 7/2015 | Chen |
| 2016/0105670 A1* | 4/2016 | Pang .................... H04N 19/105 19/105 |

OTHER PUBLICATIONS

Laroche G et al: "AHG5: Vector prediction for Intra Block Copy", 15. JCT-VC Meeting; Oct. 23, 2013-Nov. 1, 2013; Geneva; (Joint Collaborative Team on Video Coding of ISO/IEC JTC1/SC26/WG11 and ITU-T SG.16); URL: http://wftp3.itu.int/av-arch/jctvc-site/,, No. JCTVC-O0122-v2, Oct. 23, 2013 (Oct. 23, 2013), XP030115125, par. [0002], par. [7.4.9.9], figure 1.
Onno P et al: "AhG5: On the displacement vector prediction scheme for Intra Block Copy", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0062-v3, Mar. 29, 2014 (Mar. 29, 2014), XP030115957, par. [0002], par. [4.1.1], par. [4.1.1.1].
C-C Chen et al: "Description of screen content coding technology proposal by NCTU and ITRI International", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0032-v2, Mar. 27, 2014 (Mar. 27, 2014), XP030115918, Figure 2,9 par. [02.9], par. [2.9.1], par. [0003], par. [03.3]—par. [03.6].
Lai P et al: "Description of screen content coding technology proposal by MediaTek", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0033, Mar. 18, 2014 (Mar. 18, 2014), XP030115919, par. [03.6], figure 4.
He Y et al: "Non-SCCE1: Improved intra block copy coding with block vector derivation", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0165, Jun. 21, 2014 (Jun. 21, 2014), XP030116449, par. [0002], figure 1,2.
He Y et al: "CE2: Test3 IBC with block vector de", 19. JCT-VC Meeting; Oct. 17, 2014-Oct. 24, 2014; Strasbourg; (Joint Collabroative Team on Video Coding of ISO/IEC JTC1/SC29/WG11 and ITU-T SG.16); URL: http://wftp3.itu.int/av-arch/jctvc-site/,, No. JCTVC-S0131, Oct. 7, 2014 (Oct. 7, 2014), XP030116892, par. [0001], figure 1.
International Search Report and Written Opinion for PCT/US2015/036472 dated Aug. 21, 2015.
J. Chen, Y. Chen, T. Hsieh, R. Joshi, M. Karczewicz, W.-S. Kim, X. Li, C. Pang, W. Pu, K. Rapaka, J. Sole, L. Zhang, F. Zou, "Description of screen content coding technology proposal by Qualcomm", JCTVC-Q0031, Mar. 2014, Valencia, ES.
Z. Ma, W. Wang, M. Xu, X. Wang, H. Yu, "Description of screen content coding technology proposal by Huawei Technologies", JCTVC-Q0034, Mar. 2014, Valencia, ES.
B. Li, J. Xu, F. Wu, X. Guo, G J. Sullivan, "Description of screen content coding technology proposal by Microsoft", JCTVC-Q0035, Mar. 2014, Valencia, ES.
R. Cohen, A. Minezawa, X. Zhang, K. Miyazawa, A. Vetro, S. Sekiguchi, K. Sugimoto, T. Murakami, "Description of screen content coding technology proposal by Mitsubishi Electric Corporation", JCTVC-Q0036, Mar. 2014, Valencia, ES.
X. Xiu, C.-M.Tsai, Y. He, Y. Ye, "Description of screen content coding technology proposal by InterDigital", JCTVC-Q0037, Mar. 2014, Valencia, ES.
T. Lin, S. Wang, P. Zhang, and K. Zhou, "AHG8: P2M based dual-coder extension of HEVC", Document No. JCTVC-L0303, Jan. 2013.
X. Guo, B. Li, J.-Z. Xu, Y. Lu, S. Li, and F. Wu, "AHG8: Major-color-based screen content coding", Document No. JCTVC-O0182, Oct. 2013.
L. Guo, M. Karczewicz, J. Sole, and R. Joshi, "Evaluation of Palette Mode Coding on HM-12.0+RExt-4.1", JCTVC-O0218, Oct. 2013.
C. Pang, J. Sole, L. Guo, M. Karczewicz, and R. Joshi, "Non-RCE3: Intra Motion Compensation with 2-D MVs", JCTVC-N0256, Jul. 2013.
B. Bross, W-J. Han, G. J. Sullivan, J-R. Ohm, T. Wiegand, "High Efficiency Video Coding (HEVC) Text Specification Draft 10", JCTVC-L1003. Jan. 2013.
T. Vermeir, "Use cases and requirements for lossless and screen content coding", JCTVC-M0172, Apr. 2013, Incheon, KR.
J. Sole, R. Joshi, M. Karczewicz, "AhG8: Requirements for wireless display applications", JCTVC-M0315, Apr. 2013, Incheon, KR.
D. Flynn, M. Naccari, K.Sharman, C. Rosewarne, J. Sole, G. J. Sullivan, T. Suzuki, "HEVC Range Extension Draft 6", JCTVC-P1005, Jan. 2014, San Jose.
J. Sole, S. Liu, "HEVC Screen Content Coding Core Experiment 1 (SCCE1): Intra Block Copying Extensions", JCTVC-Q1121, Mar. 2014, Valencia.
C.-C. Chen, X. Xu, L. Zhang, "HEVC Screen Content Coding Core Experiment 2 (SCCE2): Line-based Intra Copy", JCTVC-Q1122, Mar. 2014, Valencia.
Y.-W. Huang, P. Onno, R. Joshi, R. Cohen, X. Xiu, Z. Ma, "HEVC Screen Content Coding Core Experiment 3 (SCCE3): Palette mode", JCTVC-Q1123, Mar. 2014, Valencia.
Y. Chen, J. Xu, "HEVC Screen Content Coding Core Experiment 4 (SCCE4): String matching for sample coding", JCTVC-Q1124, Mar. 2014, Valencia.
X. Xiu, J. Chen, "HEVC Screen Content Coding Core Experiment 5 (SCCE5): Inter-component prediction and adaptive color transforms", JCTVC-Q1125, Mar. 2014, Valencia.
X. Zhang, K. Zhang, J. An, H. Huang, S. Lei, "Block vector prediction for intra block copy", JCTVC-Q0080, Mar. 2014, Valencia.
K. Zhang, J. An, X. Zhang, H. Huang, S. Lei, "Symmetric intra block copy", JCTVC-Q0082, Mar. 2014, Valencia.
S.-T. Hsiang, T.-D. Chuang, S. Lei, "AHG8; Coding the prediction differences of the intra BC vectors", JCTVC-Q0095, Mar. 2014, Valencia.
C. Pang, J. Sole, R. Joshi, M. Karczewicz, "Block vector prediction method for intra block copy", JCTVC-Q0114, Mar. 2014, Valencia.
L. Zhu, J. Xu, G. J. Sullivan, Y. Wu, S. Sankuratri, B.A.Kumar, "Ping-pong block vector predictor for intra block copy", JCTVC-Q0134, Mar. 2014, Valencia.

(56) References Cited

OTHER PUBLICATIONS

B. Li, J. Xu, "Hash-based intraBC search", JCTVC-O0252, Mar. 2014, Valencia.

C. Pang, J .Sole, T. Hsieh, M. Karczewicz, "Intra block copy with larger search region", JCTVC-O0139, Mar. 2014, Valencia.

R. Joshi, J. Xu, R. Cohen, S. Liu, Z. Ma, Y. Ye, "Screen content coding test model 1 (SCM 1)", JCTVC-Q1014, Mar. 2014, Valencia.

ITU-T Q6/16 and ISO/IEC JCT1/SC29/WG11, "Joint Call for Proposals for Coding of Screen Content", MPEG2014/N14175, Jan. 2014, San Jose, USA.

G.J. Sullivan and T. Wiegand, Rate-distortion optimization for video compression. IEEE Signal Processing Magazine, vol. 15, issue 6, Nov. 1998.

Issued International Preliminary Report on Patentability for PCT/US2015/036472, dated Jul. 28, 2016, IPEA-409, pp. 9.

\* cited by examiner

METHODS AND SYSTEMS FOR INTRA BLOCK COPY CODING WITH BLOCK VECTOR DERIVATION

CROSS-REFERENCE TO RELATED APPLICATIONS

The present application is continuation of U.S. patent application Ser. No. 14/743,657, filed Jun. 18, 2015, now U.S. Pat. No. 9,877,043, which a non-provisional filing of, and claims benefit under 35 U.S.C. § 119(e) from, U.S. Provisional Patent Application Ser. No. 62/014,664, filed Jun. 19, 2014. The contents of that application are incorporated herein by reference in its entirety.

BACKGROUND

Over the past two decades, various digital video compression technologies have been developed and standardized to enable efficient digital video communication, distribution and consumption. Most of the commercially widely deployed standards are developed by ISO/IEC and ITU-T, such as H.261, MPEG-1, MPEG-2 H.263, MPEG-4 (part-2), and H.264/AVC (MPEG-4 part 10 Advance Video Coding). Due to the emergence and maturity of new advanced video compression technologies, a new video coding standard, High Efficiency Video Coding (HEVC), under joint development by ITU-T Video Coding Experts Group (VCEG) and ISO/IEC MPEG. HEVC (ITU-T H.265/ISO/IEC 23008-2) was approved as an international standard in early 2013, and is able to achieve substantially higher coding efficiency than the current state-of-the-art H.264/AVC.

Screen content sharing applications have become more and more popular in recent years with the proliferation of remote desktop, video conferencing and mobile media presentation applications. A two-way screen content sharing system may include a host sub-system including a capturer, encoder and transmitter, and a client sub-system including a receiver, decoder and display (renderer). There are various application requirements from industries for screen content coding (SCC). As compared to natural video content, screen content often contains numerous blocks with several major colors and strong edges because of sharp curves and text that frequently appears in screen content. Although existing video compression methods can be used to encode screen content and then transmit that content to the receiver side, most existing methods does not accommodate the characteristics of screen content and thus lead to a low compression performance. The reconstruction of screen content using conventional video coding technologies often leads to serious quality issues. For example, the curves and texts are blurred and may be difficult to recognize. Therefore, a well-designed screen-content compression method is desirable for effectively reconstructing screen content.

SUMMARY

In some exemplary embodiments, a method is provided for generating a bit stream encoding a video that includes an input video block. An encoder identifies at least a first candidate block vector (BV) for prediction of the input video block, where the first candidate block vector points to a first candidate block. The encoder then identifies a first predictive vector (e.g. a block vector or a motion vector) that was used to encode the first candidate block. From the first candidate block vector and the first predictive vector, the encoder generates a derived predictive vector (e.g. a derived block vector or a derived motion vector) from the first candidate block vector and the first predictive vector. The encoder then encodes the video block in the bit stream using the derived predictive vector for prediction of the input video block.

In some embodiments, the encoder signals the derived predictive vector in the bit stream. In some embodiments, the encoder signals the first predictive vector in the bit stream and also signals a flag in the bit stream indicating that the input video block is encoded using the derived predictive vector that is derived from the first predictive vector.

In some embodiment, the encoder signals in the bit stream an index identifying the derived predictive vector in a merge candidate list.

The derived predictive vector may be generated by adding the first candidate block vector and the first predictive vector. In such embodiments, where the first predictive vector is a second block vector, the derived predictive vector may be a block vector generated by adding the first candidate block vector and the second block vector (the first predictive vector). If the first predictive vector is a motion vector, the derived predictive vector may be a motion vector generated by adding the first candidate block vector and the first motion vector according to the equation $$MVd = BV0 + ((MV1+2) >> 2),$$

where BV0 is the first candidate block vector, MV1 is the first motion vector, and MVd is the derived motion vector.

In some exemplary embodiments, derived predictive vectors (block vectors or motion vectors) are used as merge candidates. In an exemplary method, an encoder identifies at least a first block vector merge candidate for encoding of the input video block, and the encoder identifies a first predictive vector that was used to encode the first candidate block. The encoder then generates a derived predictive vector (a derived block vector or derived motion vector) from the first block vector merge candidate and the first predictive vector. The derived predictive vector is inserted in a merge candidate list. From the merge candidate list, the encoder chooses a selected predictive vector for the prediction of the input video block. The encoder then encodes the video input block in the bit stream using the selected predictive vector for the prediction of the input video block. The selected predictive vector may be the derived predictive vector.

In some such embodiments, the encoder determines whether the merge candidate list is full before generating and inserting the derived predictive vector. The steps of generating and inserting the derived predictive vector in the merge candidate list are performed only after a determination is made that the merge candidate list is not full.

In some such embodiments, the encoder identifies the first candidate block vector by conducting a search of previously-encoded video blocks.

In an exemplary method of decoding a coded video block from a bit stream, a decoder identifies at least a first candidate block vector for the prediction of the input video block, wherein the first candidate block vector points to a first candidate block. The decoder identifies a first predictive vector used to encode the first candidate block. The decoder then generates a derived predictive vector from the first block vector and the first predictive vector and decodes the coded video block using the derived predictive vector for the prediction of the coded video block.

In such embodiments, the first candidate block vector may be identified using various different techniques. In one such method, the first candidate block vector is signaled in the bit stream, and identification of the first candidate block vector includes receiving the first candidate block vector signaled in the bit stream. In such a method, the generation of the derived predictive vector may be performed in response to receiving a flag in the bit stream indicating that the input video block is encoded with a derived predictive vector. In another such method, the identification of a first candidate block vector includes identification of a first block vector merge candidate. In such an embodiment, the derived predictive vector may also be a merge candidate. The decoder may use the derived predictive vector to decode the coded video block in response to receiving an index in the bit stream identifying the derived predictive vector merge candidate.

BRIEF DESCRIPTION OF THE DRAWINGS

A more detailed understanding may be had from the following description, presented by way of example in conjunction with the accompanying drawings, which are first briefly described below.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Figure 1:
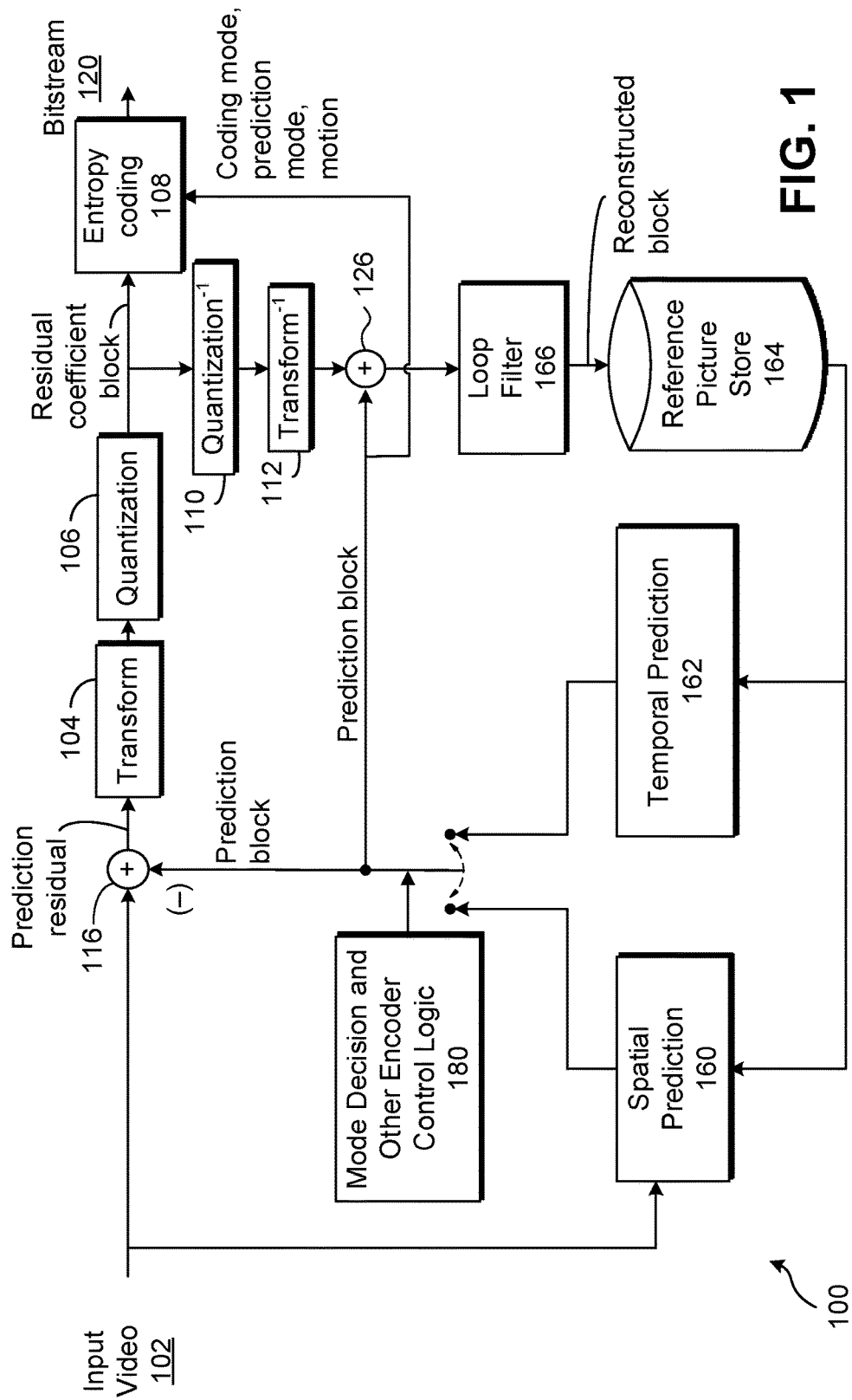
FIG. 1 is a block diagram illustrating an example of a block-based video encoder.

FIG. 1 is a block diagram illustrating an example of a block-based video encoder, for example, a hybrid video encoding system. The video encoder 100 may receive an input video signal 102. The input video signal 102 may be processed block by block. A video block may be of any size. For example, the video block unit may include 16×16 pixels. A video block unit of 16×16 pixels may be referred to as a macroblock (MB). In High Efficiency Video Coding (HEVC), extended block sizes (e.g., which may be referred to as a coding tree unit (CTU) or a coding unit (CU), two terms which are equivalent for purposes of this disclosure) may be used to efficiently compress high-resolution (e.g., 1080p and beyond) video signals. In HEVC, a CU may be up to 64×64 pixels. A CU may be partitioned into prediction units (PUs), for which separate prediction methods may be applied.

For an input video block (e.g., an MB or a CU), spatial prediction 160 and/or temporal prediction 162 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for a video block, its reference picture index may be sent. The reference picture index may be used to identify from which reference picture in a reference picture store 164 the temporal prediction signal comes.

The mode decision block 180 in the encoder may select a prediction mode, for example, after spatial and/or temporal prediction. The prediction block may be subtracted from the current video block at 116. The prediction residual may be transformed 104 and/or quantized 106. The quantized residual coefficients may be inverse quantized 110 and/or inverse transformed 112 to form the reconstructed residual, which may be added back to the prediction block 126 to form the reconstructed video block.

In-loop filtering (e.g., a deblocking filter, a sample adaptive offset, an adaptive loop filter, and/or the like) may be applied 166 to the reconstructed video block before it is put in the reference picture store 164 and/or used to code future video blocks. The video encoder 100 may output an output video stream 120. To form the output video bitstream 120, a coding mode (e.g., inter prediction mode or intra prediction mode), prediction mode information, motion information, and/or quantized residual coefficients may be sent to the entropy coding unit 108 to be compressed and/or packed to form the bitstream. The reference picture store 164 may be referred to as a decoded picture buffer (DPB).

Figure 2:
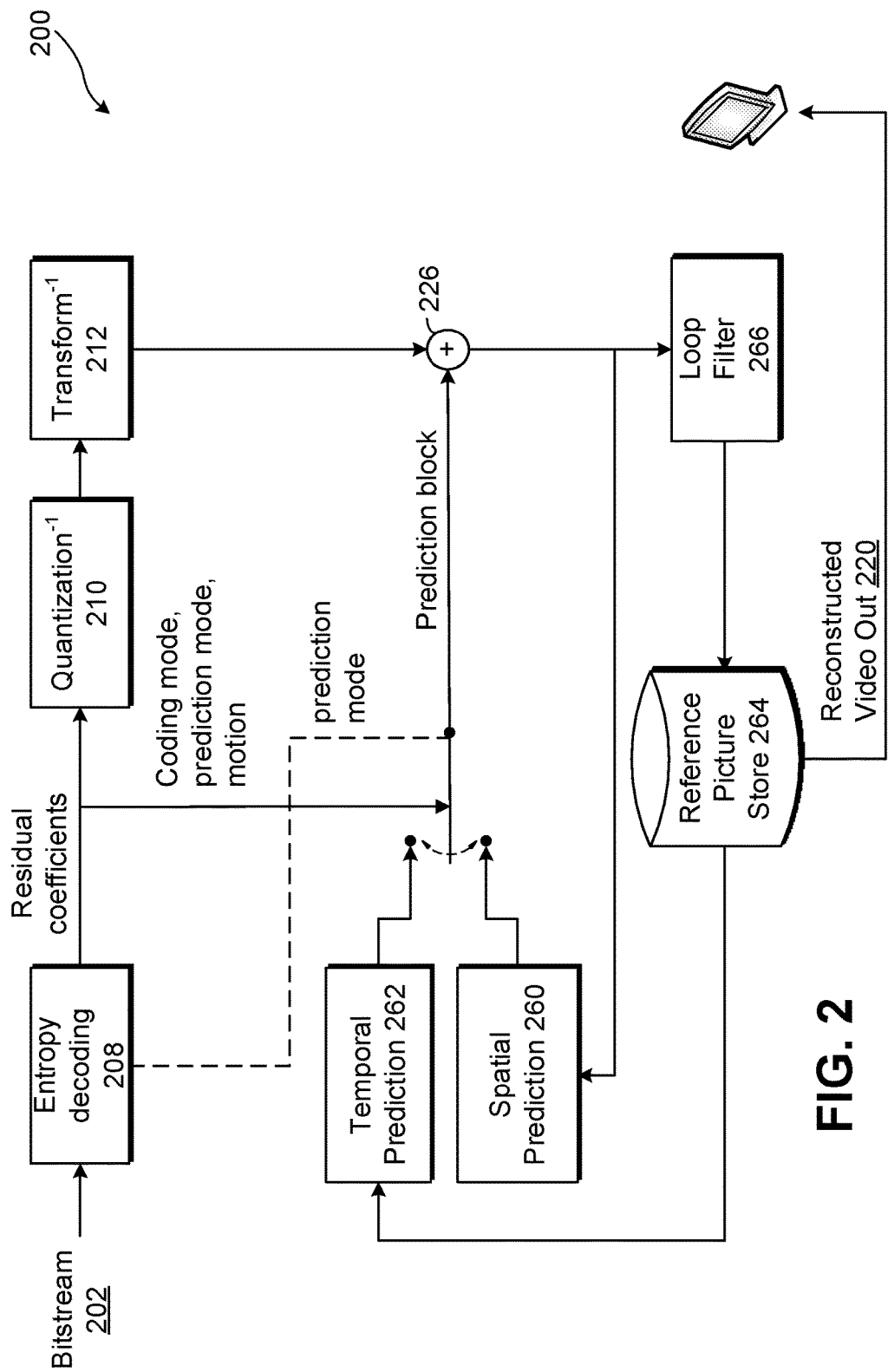
FIG. 2 is a block diagram illustrating an example of a block-based video decoder.

FIG. 2 is a block diagram illustrating an example of a block-based video decoder. The video decoder 200 may receive a video bitstream 202. The video bitstream 202 may be unpacked and/or entropy decoded at entropy decoding unit 208. The coding mode and/or prediction information used to encode the video bitstream may be sent to the spatial prediction unit 260 (e.g., if intra coded) and/or the temporal prediction unit 262 (e.g., if inter coded) to form a prediction block. If inter coded, the prediction information may comprise prediction block sizes, one or more motion vectors (e.g., which may indicate direction and amount of motion), and/or one or more reference indices (e.g., which may indicate from which reference picture to obtain the prediction signal). Motion-compensated prediction may be applied by temporal prediction unit 262 to form a temporal prediction block.

The residual transform coefficients may be sent to an inverse quantization unit 210 and an inverse transform unit 212 to reconstruct the residual block. The prediction block and the residual block may be added together at 226. The reconstructed block may go through in-loop filtering 266 before it is stored in reference picture store 264. The reconstructed video in the reference picture store 264 may be used to drive a display device and/or used to predict future video blocks. The video decoder 200 may output a reconstructed video signal 220. The reference picture store 264 may also be referred to as a decoded picture buffer (DPB).

A video encoder and/or decoder (e.g., video encoder 100 or video decoder 200) may perform spatial prediction (e.g., which may be referred to as intra prediction). Spatial prediction may be performed by predicting from already coded neighboring pixels following one of a plurality of prediction directions (e.g., which may be referred to as directional intra prediction).

Figure 3:
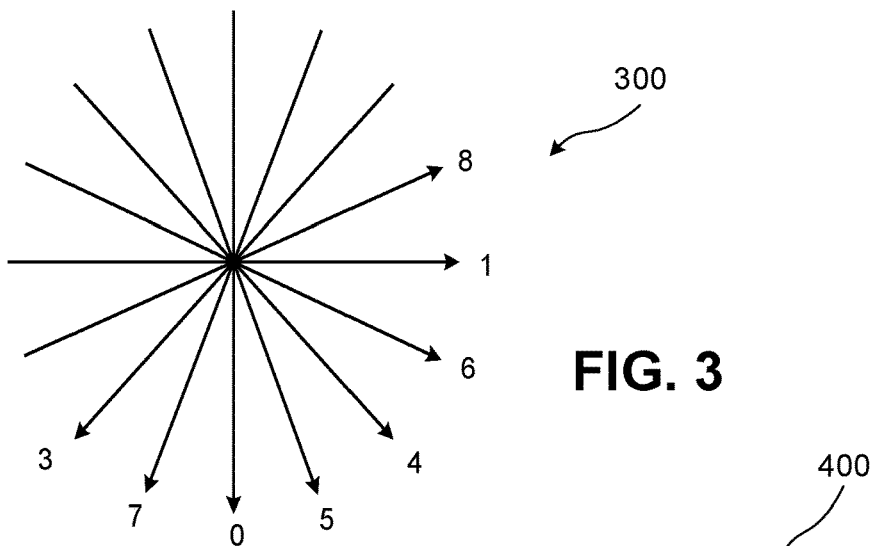
FIG. 3 is a diagram of an example of eight directional prediction modes.

FIG. 3 is a diagram of an example of eight directional prediction modes. The eight directional prediction modes of FIG. 3 may be supported in H.264/AVC. As shown generally at 300 in FIG. 3, the nine modes (including DC mode 2) are:

Mode 0: Vertical Prediction
Mode 1: Horizontal prediction
Mode 2: DC prediction
Mode 3: Diagonal down-left prediction
Mode 4: Diagonal down-right prediction
Mode 5: Vertical-right prediction
Mode 6: Horizontal-down prediction
Mode 7: Vertical-left prediction
Mode 8: Horizontal-up prediction Spatial prediction may be performed on a video block of various sizes and/or shapes. Spatial prediction of a luma component of a video signal may be performed, for example, for block sizes of 4×4, 8×8, and 16×16 pixels (e.g., in H.264/AVC). Spatial prediction of a chroma component of a video signal may be performed, for example, for block size of 8×8 (e.g., in H.264/AVC). For a luma block of size 4×4 or 8×8, a total of nine prediction modes may be supported, for example, eight directional prediction modes and the DC mode (e.g., in H.264/AVC). Four prediction modes may be supported; horizontal, vertical, DC, and planar prediction, for example, for a luma block of size 16×16.

Furthermore, directional intra prediction modes and non-directional prediction modes may be supported.

Figure 4:
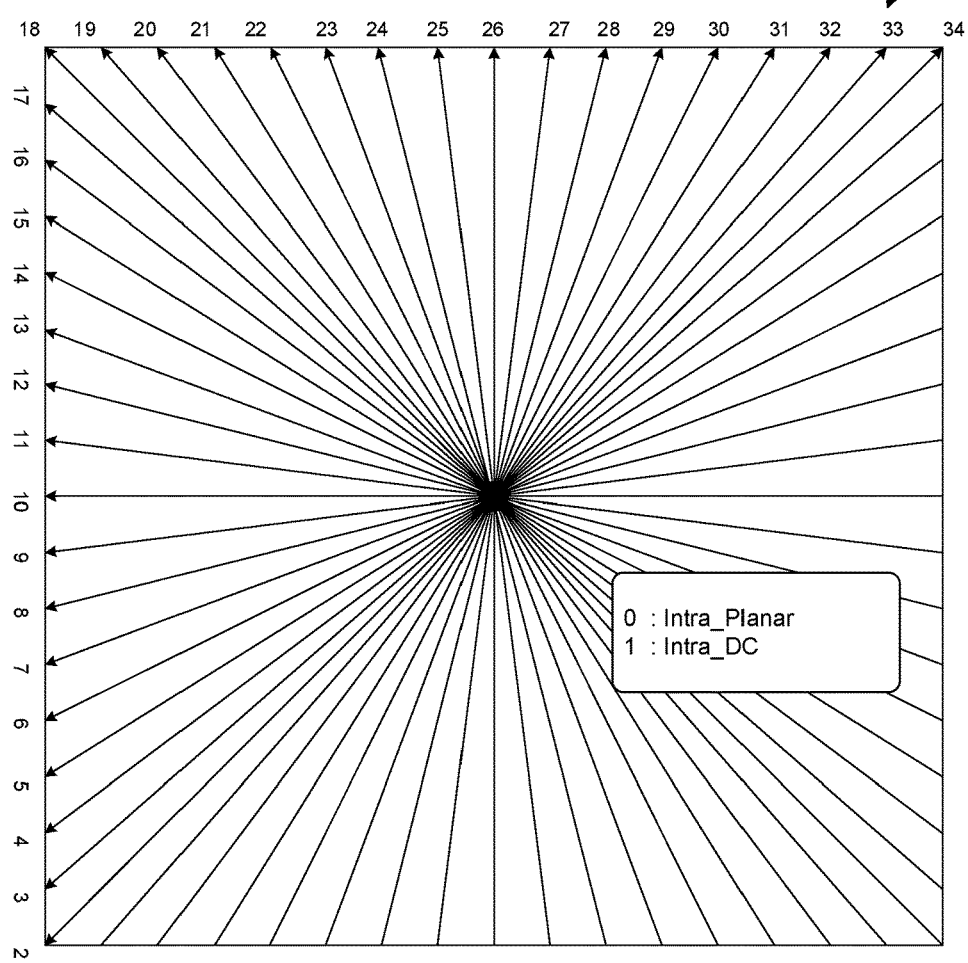
FIG. 4 is a diagram illustrating an example of 33 directional prediction modes and two non-directional prediction modes.

FIG. 4 is a diagram illustrating an example of 33 directional prediction modes and two non-directional prediction modes. The 33 directional prediction modes and two non-directional prediction modes, shown generally at 400 in FIG. 4, may be supported by HEVC. Spatial prediction using larger block sizes may be supported. For example, spatial prediction may be performed on a block of any size, for example, of square block sizes of 4×4, 8×8, 16×16, 32×32, or 64×64. Directional intra prediction (e.g., in HEVC) may be performed with 1/32-pixel precision.

Non-directional intra prediction modes may be supported (e.g., in H.264/AVC, HEVC, or the like), for example, in addition to directional intra prediction. Non-directional intra prediction modes may include the DC mode and/or the planar mode. For the DC mode, a prediction value may be obtained by averaging the available neighboring pixels and the prediction value may be applied to the entire block uniformly. For the planar mode, linear interpolation may be used to predict smooth regions with slow transitions. H.264/AVC may allow for use of the planar mode for 16×16 luma blocks and chroma blocks.

An encoder (e.g., the encoder 100) may perform a mode decision (e.g., at block 180 in FIG. 1) to determine the best coding mode for a video block. When the encoder determines to apply intra prediction (e.g., instead of inter prediction), the encoder may determine an optimal intra prediction mode from the set of available modes. The selected directional intra prediction mode may offer strong hints as to the direction of any texture, edge, and/or structure in the input video block.

Figure 5:
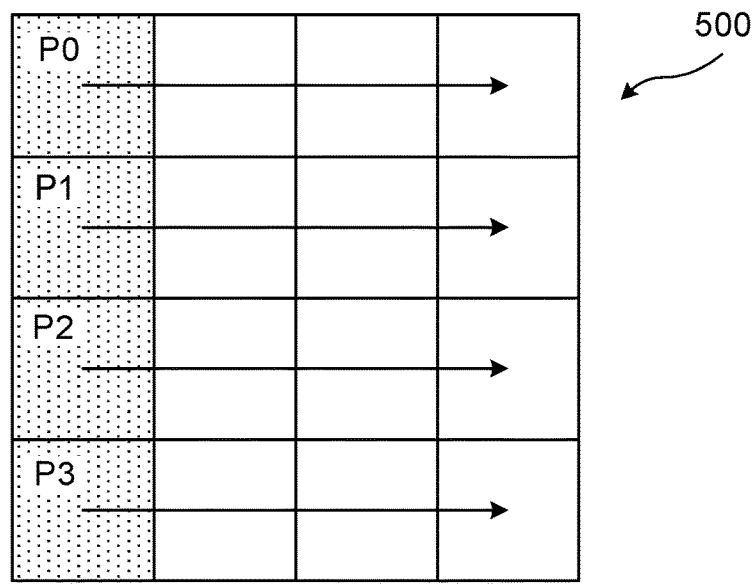
FIG. 5 is a diagram of an example of horizontal prediction.

FIG. 5 is a diagram of an example of horizontal prediction (e.g., for a 4×4 block), as shown generally at 500 in FIG. 5. Already reconstructed pixels P0, P1, P2 and P3 (i.e., the shaded boxes) may be used to predict the pixels in the current 4×4 video block. In horizontal prediction, a reconstructed pixel, for example, pixels P0, P1, P2 and/or P3, may be propagated horizontally along the direction of a corresponding row to predict the 4×4 block. For example, prediction may be performed according to Equation (1) below, where $L(x, y)$ may be the pixel to be predicted at $(x, y)$, $x, y = 0 \ldots 3$.

$$L(x,0)=P0$$

$$L(x,1)=P1$$

$$L(x,2)=P2$$

$$L(x,3)=P3 \qquad (1)$$

Figure 6:
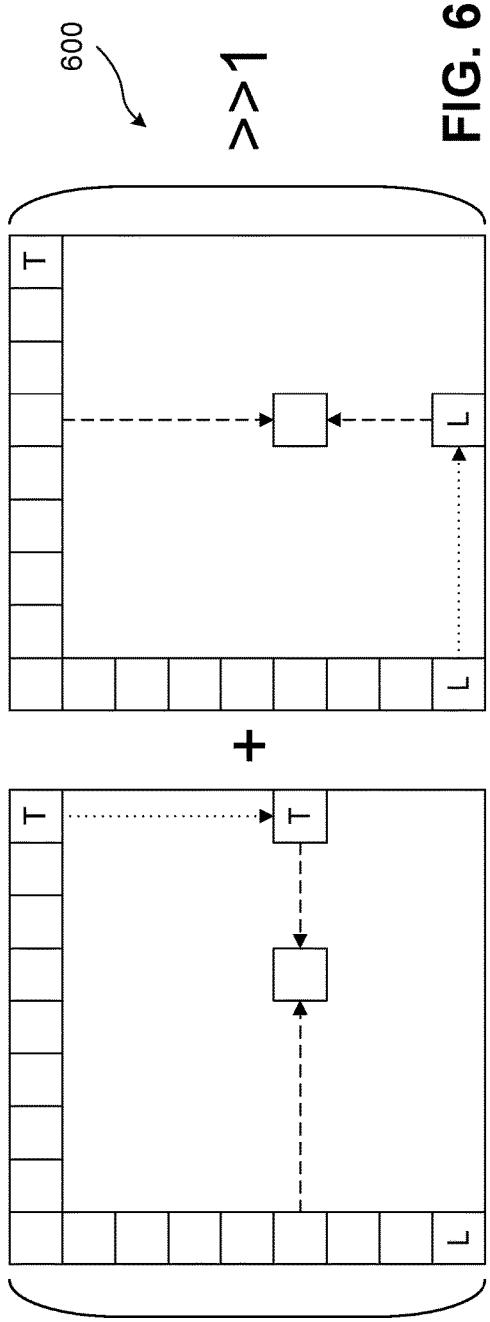
FIG. 6 is a diagram of an example of the planar mode.

FIG. 6 is a diagram of an example of the planar mode, as shown generally at 600 in FIG. 6. The planar mode may be performed accordingly: the rightmost pixel in the top row (marked by a T) may be replicated to predict pixels in the rightmost column. The bottom pixel in the left column (marked by an L) may be replicated to predict pixels in the bottom row. Bilinear interpolation in the horizontal direction (as shown in the left block) may be performed to produce a first prediction $H(x,y)$ of center pixels. Bilinear interpolation in the vertical direction (e.g., as shown in the right block) may be performed to produce a second prediction $V(x,y)$ of center pixels. An averaging between the horizontal prediction and the vertical prediction may be performed to obtain a final prediction $L(x,y)$, using $L(x,y)=((H(x,y)+V(x,y))\gg 1)$.

Figure 7:
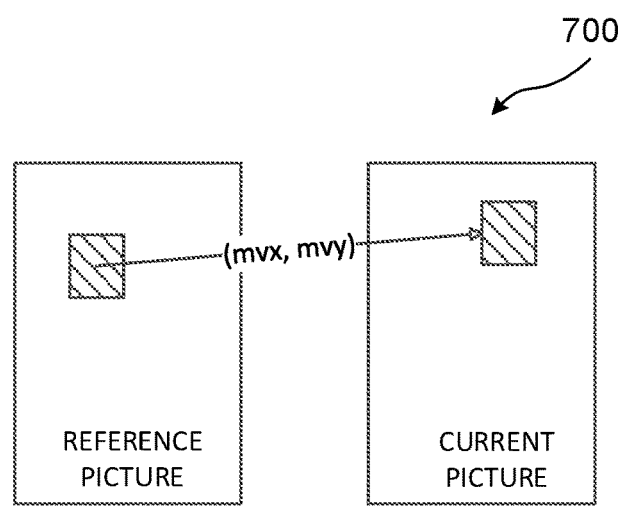
FIG. 7 is a diagram illustrating an example of motion prediction.
Figure 8:
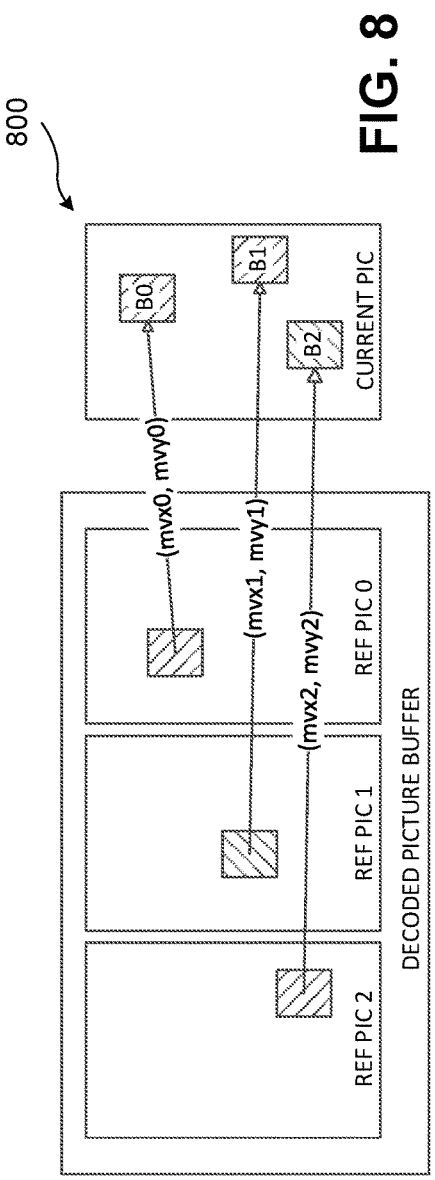
FIG. 8 is a diagram illustrating an example of block-level movement within a picture.

FIG. 7 and FIG. 8 are diagrams illustrating, as shown generally at 700 and 800, an example of motion prediction of video blocks (e.g., using temporal prediction unit 162 of FIG. 1). FIG. 8, which illustrates an example of block-level movement within a picture, is a diagram illustrating an example decoded picture buffer including, for example, reference pictures "Ref pic 0," "Ref pic 1," and "Ref pic2." The blocks B0, B1, and B2 in a current picture may be predicted from blocks in reference pictures "Ref pic 0," "Ref pic 1," and "Ref pic2" respectively. Motion prediction may use video blocks from neighboring video frames to predict the current video block. Motion prediction may exploit temporal correlation and/or remove temporal redundancy inherent in the video signal. For example, in H.264/AVC and HEVC, temporal prediction may be performed on video blocks of various sizes (e.g., for the luma component, temporal prediction block sizes may vary from 16×16 to 4×4 in H.264/AVC, and from 64×64 to 4×4 in HEVC). With a motion vector of (mvx, mvy), temporal prediction may be performed as provided by equation (2):

$$P(x,y) = ref(x-mvx, y-mvy) \quad (2)$$

where ref(x,y) may be pixel value at location (x, y) in the reference picture, and P(x,y) may be the predicted block. A video coding system may support inter-prediction with fractional pixel precision. When a motion vector (mvx, mvy) has fractional pixel value, one or more interpolation filters may be applied to obtain the pixel values at fractional pixel positions. Block-based video coding systems may use multi-hypothesis prediction to improve temporal prediction, for example, where a prediction signal may be formed by combining a number of prediction signals from different reference pictures. For example, H.264/AVC and/or HEVC may use bi-prediction that may combine two prediction signals. Bi-prediction may combine two prediction signals, each from a reference picture, to form a prediction, such as the following equation (3):

$$P(x, y) = \frac{P_0(x, y) + P_1(x, y)}{2} = \frac{ref_0(x - mvx_0, y - mvy_0) + ref_1(x - mvx_1, y - mvy_1)}{2} \quad (3)$$

where $P_0(x, y)$ and $P_1(x, y)$ may be the first and the second prediction block, respectively. As illustrated in equation (3), the two prediction blocks may be obtained by performing motion-compensated prediction from two reference pictures $ref_0(x, y)$ and $ref_1(x, y)$, with two motion vectors (mvx$_0$, mvy$_0$) and (mvx$_1$, mvy$_1$), respectively. The prediction block P(x,y) may be subtracted from the source video block (e.g., at 116) to form a prediction residual block. The prediction residual block may be transformed (e.g., at transform unit 104) and/or quantized (e.g., at quantization unit 106). The quantized residual transform coefficient blocks may be sent to an entropy coding unit (e.g., entropy coding unit 108) to be entropy coded to reduce bit rate. The entropy coded residual coefficients may be packed to form part of an output video bitstream (e.g., bitstream 120).

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, multiple layer video coding technologies, such as scalable video coding and/or multi-view video coding, may be designed to handle more than one video layer where each layer may be decoded to reconstruct a video signal of a particular spatial resolution, temporal resolution, fidelity, and/or view. Although a single layer encoder and decoder are described with reference to FIG. 1 and FIG. 2, the concepts described herein may utilize a multiple layer encoder and/or decoder, for example, for multi-view and/or scalable coding technologies.

Scalable video coding may improve the quality of experience for video applications running on devices with different capabilities over heterogeneous networks. Scalable video coding may encode the signal once at a highest representation (e.g., temporal resolution, spatial resolution, quality, etc.), but enable decoding from subsets of the video streams depending on the specific rate and representation required by certain applications running on a client device. Scalable video coding may save bandwidth and/or storage compared to non-scalable solutions. The international video standards, e.g., MPEG-2 Video, H.263, MPEG4 Visual, H.264, etc., may have tools and/or profiles that support modes of scalability.

Table 1 provides an example of different types of scalabilities along with the corresponding standards that may support them. Bit-depth scalability and/or chroma format scalability may be tied to video formats (e.g., higher than 8-bit video, and chroma sampling formats higher than YUV4:2:0), for example, which may primarily be used by professional video applications. Aspect ratio scalability may be provided.

TABLE 1

| Scalability | Example | Standards |
| --- | --- | --- |
| View scalability | 2D→3D (2 or more views) | MVC, MFC, 3DV |
| Spatial scalability | 720p→1080p | SVC, scalable HEVC |
| Quality (SNR) scalability | 35 dB→38 dB | SVC, scalable HEVC |
| Temporal scalability | 30fps→60fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC |
| Chroma format scalability | YUV4:2:0→YUV4:2:2, YUV4:4:4 | Scalable HEVC |
| Color Gamut Scalability | BT.709 → BT.2020 | Scalable HEVC |
| Aspect ratio scalability | 4:3→16:9 | Scalable HEVC |

Scalable video coding may provide a first level of video quality associated with a first set of video parameters using the base layer bitstream. Scalable video coding may provide one or more levels of higher quality associated with one or more sets of enhanced parameters using one or more enhancement layer bitstreams. The set of video parameters may include one or more of spatial resolution, frame rate, reconstructed video quality (e.g., in the form of SNR, PSNR, VQM, visual quality, etc.), 3D capability (e.g., with two or more views), luma and chroma bit depth, chroma format, and underlying single-layer coding standard. Different use cases may use different types of scalability, for example, as illustrated in Table 1. A scalable coding architecture may offer a common structure that may be configured to support one or more scalabilities (e.g., the scalabilities listed in Table 1). A scalable coding architecture may be flexible to support different scalabilities with minimum configuration efforts. A scalable coding architecture may include at least one preferred operating mode that may not require changes to block level operations, such that the coding logics (e.g., encoding and/or decoding logics) may be maximally reused within the scalable coding system. For example, a scalable coding architecture based on a picture level inter-layer processing and management unit may be provided, wherein the inter-layer prediction may be performed at the picture level.

Figure 9:
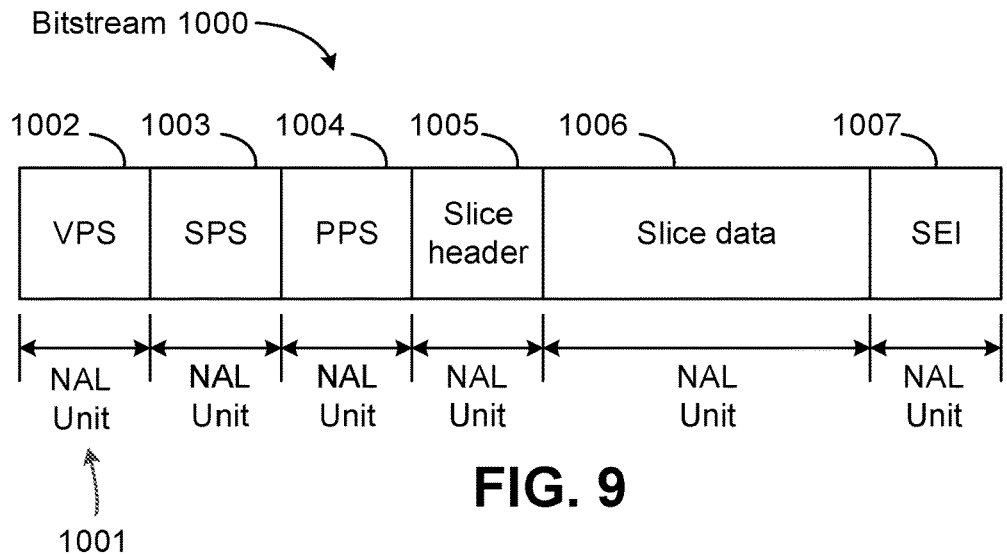
FIG. 9 is a diagram illustrating an example of a coded bitstream structure.

FIG. 9 is a diagram illustrating an example of a coded bitstream structure. A coded bitstream 1000 consists of a number of NAL (Network Abstraction layer) units 1001. A NAL unit may contain coded sample data such as coded slice 1006, or high level syntax metadata such as parameter set data, slice header data 1005 or supplemental enhancement information data 1007 (which may be referred to as an SEI message). Parameter sets are high level syntax structures containing essential syntax elements that may apply to multiple bitstream layers (e.g. video parameter set 1002 (VPS)), or may apply to a coded video sequence within one layer (e.g. sequence parameter set 1003 (SPS)), or may apply to a number of coded pictures within one coded video sequence (e.g. picture parameter set 1004 (PPS)). The parameter sets can be either sent together with the coded pictures of the video bit stream, or sent through other means (including out-of-band transmission using reliable channels, hard coding, etc.). Slice header 1005 is also a high level syntax structure that may contain some picture-related information that is relatively small or relevant only for certain slice or picture types. SEI messages 1007 carry the information that may not be needed by the decoding process but can be used for various other purposes such as picture output timing or display as well as loss detection and concealment.

Figure 10:
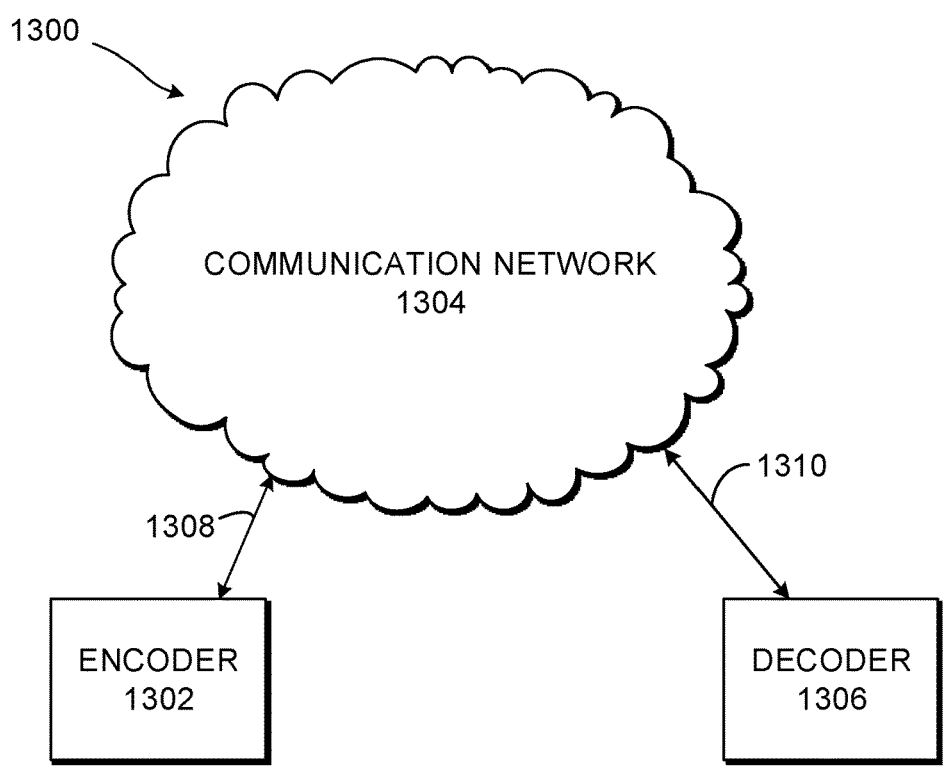
FIG. 10 is a diagram illustrating an example communication system.

FIG. 10 is a diagram illustrating an example of a communication system. The communication system 1300 may comprise an encoder 1302, a communication network 1304, and a decoder 1306. The encoder 1302 may be in communication with the network 1304 via a connection 1308, which may be a wireline connection or a wireless connection. The encoder 1302 may be similar to the block-based video encoder of FIG. 1. The encoder 1302 may include a single layer codec (e.g., FIG. 1) or a multilayer codec. For example, the encoder 1302 may be a multi-layer (e.g., two-layer) scalable coding system with picture-level ILP support. The decoder 1306 may be in communication with the network 1304 via a connection 1310, which may be a wireline connection or a wireless connection. The decoder 1306 may be similar to the block-based video decoder of FIG. 2. The decoder 1306 may include a single layer codec (e.g., FIG. 2) or a multilayer codec. For example, the decoder 1306 may be a multi-layer (e.g., two-layer) scalable decoding system with picture-level ILP support.

The encoder 1302 and/or the decoder 1306 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1304 may be a suitable type of communication network. For example, the communications network 1304 may be a multiple access system that provides content, such as voice, data, video, messaging, broadcast, etc., to multiple wireless users. The communications network 1304 may enable multiple wireless users to access such content through the sharing of system resources, including wireless bandwidth. For example, the communications network 1304 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1304 may include multiple connected communication networks. The communication network 1304 may include the Internet and/or one or more private commercial networks such as cellular networks, WiFi hotspots, Internet Service Provider (ISP) networks, and/or the like.

Figure 11:
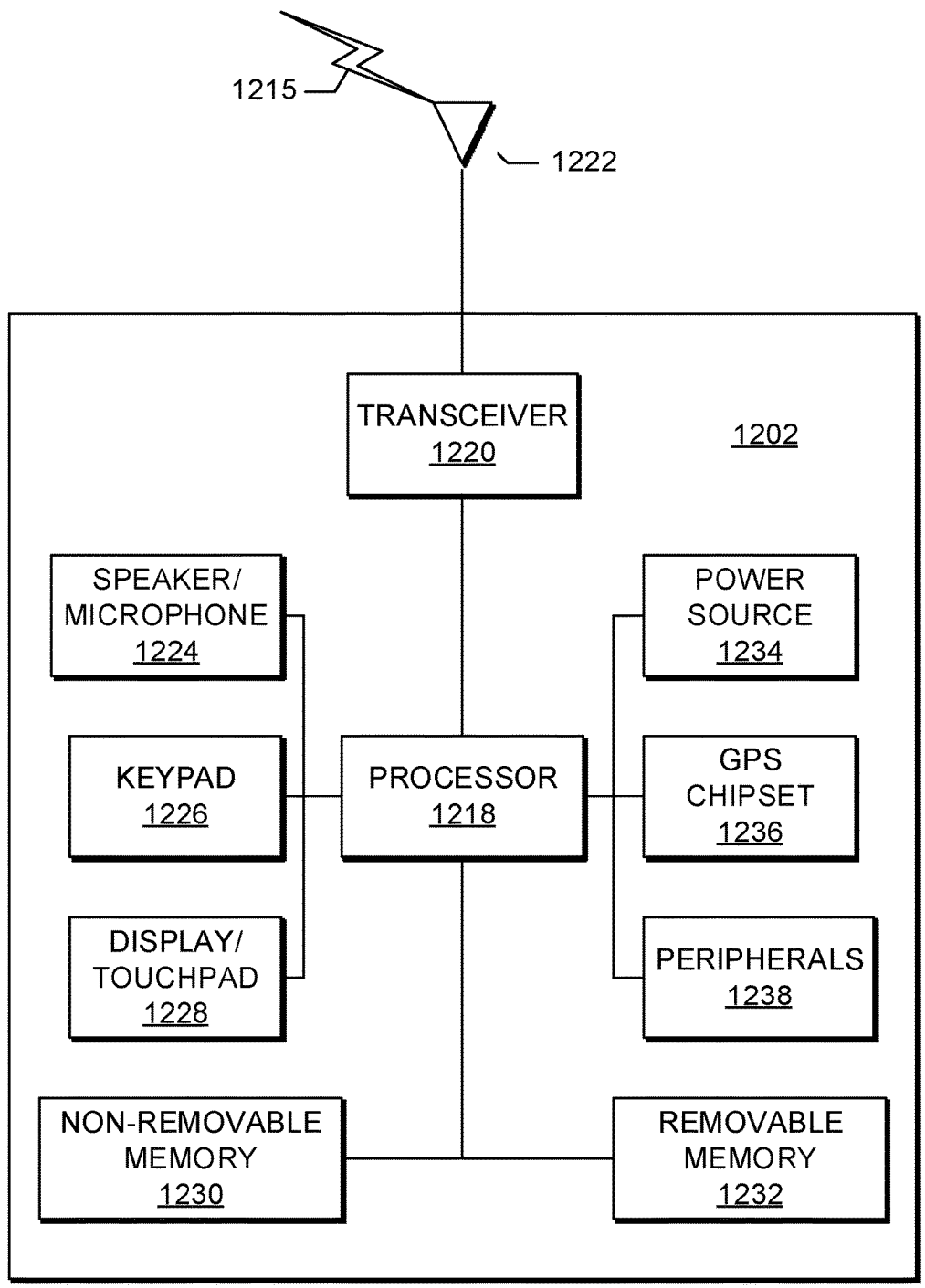
FIG. 11 is a diagram illustrating an example wireless transmit/receive unit (WTRU).

FIG. 11 is a system diagram of an example WTRU. As shown the example WTRU 1202 may include a processor 1218, a transceiver 1220, a transmit/receive element 1222, a speaker/microphone 1224, a keypad or keyboard 1226, a display/touchpad 1228, non-removable memory 1230, removable memory 1232, a power source 1234, a global positioning system (GPS) chipset 1236, and/or other peripherals 1238. It will be appreciated that the WTRU 1202 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1202 of FIG. 11.

The processor 1218 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1500 to operate in a wired and/or wireless environment. The processor 1218 may be coupled to the transceiver 1220, which may be coupled to the transmit/receive element 1222. While FIG. 11 depicts the processor 1218 and the transceiver 1220 as separate components, it will be appreciated that the processor 1218 and the transceiver 1220 may be integrated together in an electronic package and/or chip.

The transmit/receive element 1222 may be configured to transmit signals to, and/or receive signals from, another terminal over an air interface 1215. For example, in one or more embodiments, the transmit/receive element 1222 may be an antenna configured to transmit and/or receive RF signals. In one or more embodiments, the transmit/receive element 1222 may be an emitter/detector configured to transmit and/or receive IR, UV, or visible light signals, for example. In one or more embodiments, the transmit/receive element 1222 may be configured to transmit and/or receive both RF and light signals. It will be appreciated that the transmit/receive element 1222 may be configured to transmit and/or receive any combination of wireless signals.

In addition, although the transmit/receive element 1222 is depicted in FIG. 11 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1215.

The transceiver 1220 may be configured to modulate the signals that are to be transmitted by the transmit/receive element 1222 and/or to demodulate the signals that are received by the transmit/receive element 1222. As noted above, the WTRU 1202 may have multi-mode capabilities. Thus, the transceiver 1220 may include multiple transceivers for enabling the WTRU 1500 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In one or more embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1215 from a terminal (e.g., a base station) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1202 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1202 and/or a communication network (e.g., communication network 804) may implement a radio technology such as Universal Mobile Telecommunications System (UMTS) Terrestrial Radio Access (UTRA), which may establish the air interface 1215 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1202 and/or a communication network (e.g., communication network 804) may implement a radio technology such as Evolved UMTS Terrestrial Radio Access (E-UTRA), which may establish the air interface 1515 using Long Term Evolution (LTE) and/or LTE-Advanced (LTE-A).

The WTRU 1202 and/or a communication network (e.g., communication network 804) may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Figure 12:
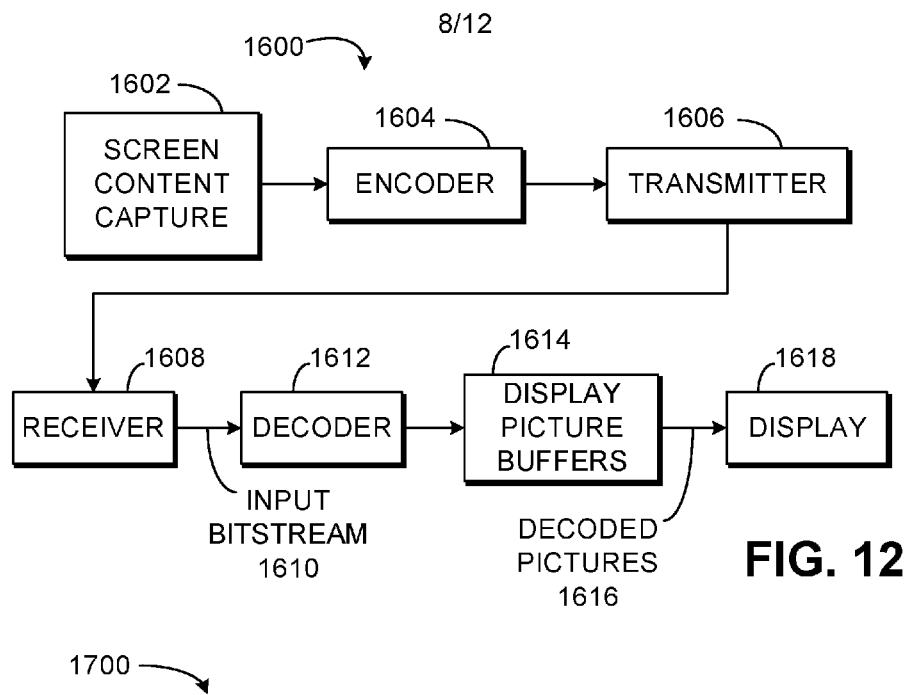
FIG. 12 is a diagram illustrating an example screen-content-sharing system.

FIG. 12 is a diagram illustrating an example two-way screen-content-sharing system 1600. The diagram illustrates a host sub-system including capturer 1602, encoder 1604, and transmitter 1606. FIG. 12 further illustrates a client sub-system including receiver 1608 (which outputs a received input bitstream 1610), decoder 1612, and display (renderer) 1618. The decoder 1612 outputs to display picture buffers 1614, which in turn transmits decoded pictures 1616 to the display 1618. There are application requirements from industries for screen content coding (SCC). See [R12], [R13]. Screen content compression methods are becoming important for some specific applications because more and more people share their device content for media presentation or remote desktop purposes. The screen displays of mobile devices have greatly improved to support high definition or ultra-high definition resolutions. Traditional video coding methods increase the bandwidth requirement for transmitting screen content in screen-sharing applications.

As discussed above, FIG. 2 is a block diagram of a generic block-based single layer decoder that receives a video bitstream produced by an encoder such as the encoder in FIG. 1, and reconstructs the video signal to be displayed. As also discussed above, at the video decoder, the bitstream is first parsed by the entropy decoder. The residual coefficients are inverse quantized and inverse transformed to obtain the reconstructed residual. The coding mode and prediction information are used to obtain the prediction signal using either spatial prediction or temporal prediction. The prediction signal and the reconstructed residual are added together to get the reconstructed video. The reconstructed video may additionally go through loop filtering before being stored in the reference picture store to be displayed and/or to be used to decode future video signals. As shown in FIG. 1, to achieve efficient compression, a single layer encoder employs widely known techniques such as spatial prediction (also referred to as intra prediction) and temporal prediction (also referred to as inter prediction and/or motion compensated prediction) to predict the input video signal. The encoder also has mode decision logic that chooses the most suitable form of prediction, usually based on certain criteria such as a combination of rate and distortion considerations. See [R11]. The encoder then transforms and quantizes the prediction residual (the difference signal between the input signal and the prediction signal). The quantized residual, together with the mode information (e.g., intra or inter prediction) and prediction information (motion vectors, reference picture indexes, intra prediction modes, etc.) are further compressed at the entropy coder and packed into the output video bitstream. As shown in FIG. 1, the encoder also generates the reconstructed video signal by applying inverse quantization and inverse transform to the quantized residual to obtain a reconstructed residual, and adding it back to the prediction signal. The reconstructed video signal may additionally go through a loop filter process (for example, deblocking filter, Sample Adaptive Offsets, or Adaptive Loop Filters), and is finally stored in the reference picture store to be used to predict future video signal.

In order to save transmission bandwidth and storage, MPEG has been working on video coding standards for many years. High Efficiency Video Coding (HEVC) (see [R13]) is an emerging video compression standard. HEVC is currently being jointly developed by ITU-T Video Coding Experts Group (VCEG) and ISO/IEC Moving Picture Experts Group (MPEG) together. It can save 50% bandwidth compared to H.264 with the same quality. HEVC is still a block-based hybrid video coding standard, in that its encoder and decoder generally operate according to the manner discussed above in connection with FIG. 1 and FIG. 2. HEVC allows the use of larger video blocks, and it uses quadtree partition to signal block coding information. The picture or slice is first partitioned into coding tree blocks (CTB) having the same size (e.g., 64×64). Each CTB is partitioned into CUs with quadtree, and each CU is partitioned further into prediction units (PU) and transform units (TU), also using quadtree. For each inter coded CU, its PU can be one of 8 partition modes, as shown and discussed above in connection with FIG. 3. Temporal prediction, also called motion compensation, is applied to reconstruct all inter coded PUs. Depending on the precision of the motion vectors (which can be up to quarter pixel in HEVC), linear filters are applied to obtain pixel values at fractional positions. In HEVC, the interpolation filters have 7 or 8 taps for luma and 4 taps for chroma. The deblocking filter in HEVC is content based; different deblocking filter operations are applied at the TU and PU boundaries, depending on a number of factors, such as coding mode difference, motion difference, reference picture difference, pixel value difference, and so on. For entropy coding, HEVC adopts context-based adaptive arithmetic binary coding (CABAC) for most block level syntax elements except high level parameters. There are two kinds of bins in CABAC coding: one is context-based coded regular bins, and the other is by-pass coded bins without context.

Although the current HEVC design contains various block coding modes, it does not fully utilize the spatial redundancy for screen content coding. This is because the HEVC is focused on continuous tone video content in 4:2:0 format, and the mode decision and transform coding tools are not optimized for the discrete tone screen content, which is often captured in the format of 4:4:4 video. As the HEVC standard began to mature and stabilize in late 2012, the standardization bodies VCEG and MPEG started to work on the future extension of HEVC for screen content coding. In January 2014, the Call for Proposals (CFP) of screen content coding was jointly issued by ITU-T VCEG and ISO/IEC MPEG. The CFP received a fair amount of attention, and resulted in seven responses [R2]-[R8] from various different companies proposing various efficient SCC solutions. Given that screen content material such as text and graphics show different characteristics compared to natural video content, some novel coding tools that improve the coding efficiency of screen content coding were proposed, for example, 1D string copy [R9], palette coding [R10], [R11] and intra block copy (IntraBC) [R12], [R17]. All those screen content coding related tools were investigated in core experiments [R18]-[R22]. Screen content has highly repetitive patterns in term of line segments or blocks and many small homogeneous regions (e.g. mono-color regions). Usually only a few colors exist within a small block. In contrast, there are many colors even in a small block for natural video. The color value at each position is usually repeated from its above or horizontal neighboring pixel. 1D string copy involves predicting the string with variable length from previous reconstructed pixel buffers. The position and string length will be signaled. In palette coding mode, instead of directly coding the pixel value, a palette table is used as a dictionary to record those significant colors. And the corresponding palette index map is used to represent the color value of each pixel within the coding block. Furthermore, the "run" values are used to indicate the length of consecutive pixels that have the same significant colors (i.e., palette index), to reduce the spatial redundancy. Palette coding is usually good for large blocks containing sparse colors. An intra block copy involves using the reconstructed pixels to predict current coding blocks within the same picture, and the displacement information—which is referred to as block vector—is coded.

Figure 13:
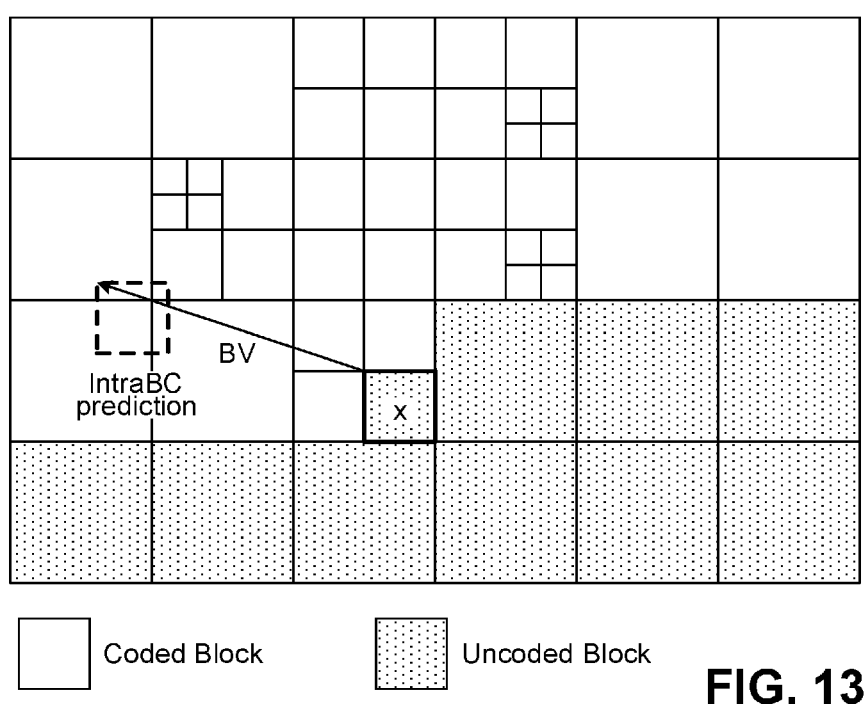
FIG. 13 is a diagram illustrating an example of full frame intra block copy mode.

FIG. 13 is a diagram illustrating an example of full frame intra block copy mode. Considering the complexity and bandwidth access, in HEVC screen content coding extension reference software (SCM-1.0) [R31] has two configurations for intra block copy mode. One is full frame intra block copy mode, in which all reconstructed pixels can be used for prediction as shown generally at 1700 in FIG. 13. In order to reduce the block vector searching complexity, hash based intra block copy search was proposed [R29], [R30]. Another is local region intra block copy mode, which is discussed next.

Figure 14:
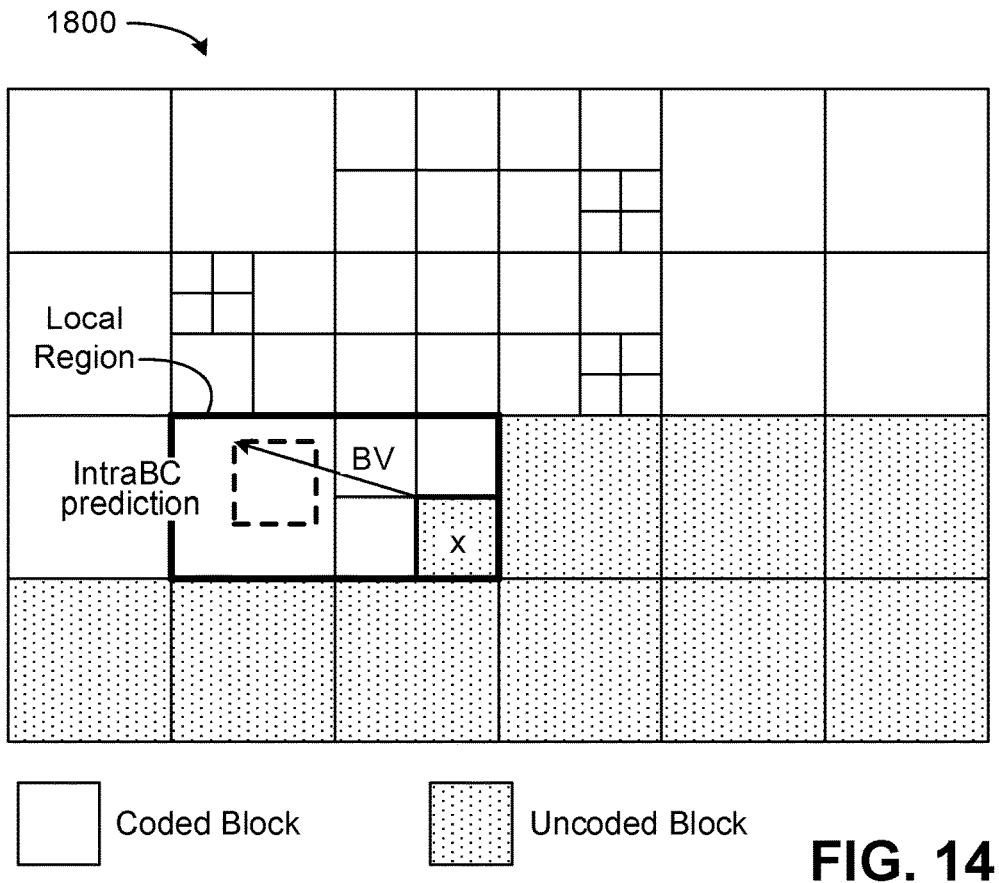
FIG. 14 is a diagram illustrating an example of local region intra block copy mode.

FIG. 14 is a diagram illustrating an example of local region intra block copy mode, as shown generally at 1800. When local region intra block copy mode is used, only those reconstructed pixels in the left and current coding tree units (CTU) are allowed to be used as reference.

There is another difference between SCC and natural video coding. For natural video coding, the coding distortion distributes in the whole picture. However, for screen content, the error is usually localized around strong edges, which makes the artifacts more visible even when the PSNR (peak signal to noise ratio) is quite high for whole picture. Therefore, screen content is more difficult to encode from subjective quality point of view.

The use intra block copying mode requires signaling of the block vector. In full frame intra block copy configuration, the block vector can be very large, resulting in high overhead for intra block copy mode. Often, one block can find multiple similar matches because there is a highly repetitive pattern for screen content. In order to improve the block vector coding efficiency, various prediction and coding methods have been proposed [R23]-[R28]. Embodiments of the presently disclosed systems and methods use block vector derivation to improve intra block copy coding efficiency. Among the variations discussed and described in this disclosure are (i) block vector derivation in intra block copy merge mode and (ii) block vector derivation in intra block copy with explicit block vector mode.

Included in the present disclosure is discussion of a displacement information derivation method for intra block copy coding. Depending on the coding type of a reference block, a derived block vector or motion vector can be used in different ways. One method is to use the derived BV as a merge candidate in IntraBC merge mode; this option is discussed below in a subsection that is entitled "Intra Block Copy Merge Mode." Another method is to use the derived BV/MV for normal IntraBC prediction; this option is discussed below in a subsection that is entitled "Intra Block Copy Mode with Derived Block Vector."

Figure 16:
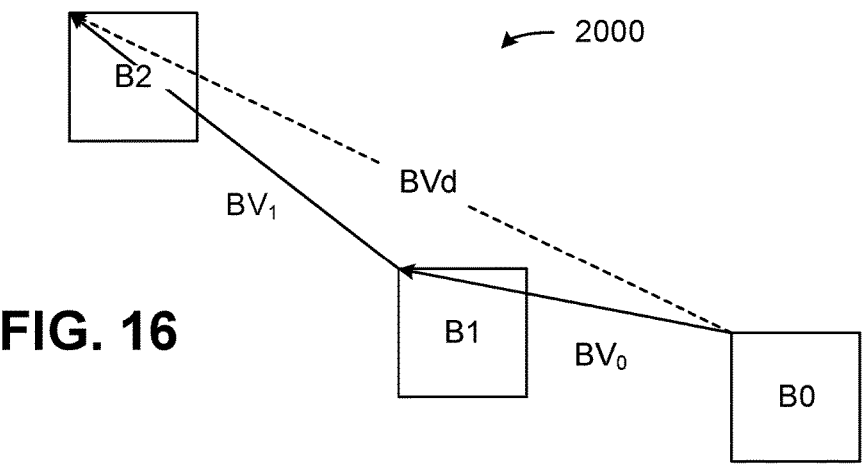
FIG. 16 is a diagram illustrating an example block vector derivation.

FIG. 16 is a diagram illustrating an example block vector derivation. Given the block vector, the second block vector can be derived if the reference block pointed to by the given BV is an IntraBC coded block. The derived block vector is calculated in Eq. (4). FIG. 16 shows this kind of block vector derivation generally at 2000.

$$BVd=BV0+BV1 \qquad (4)$$

Figure 17:
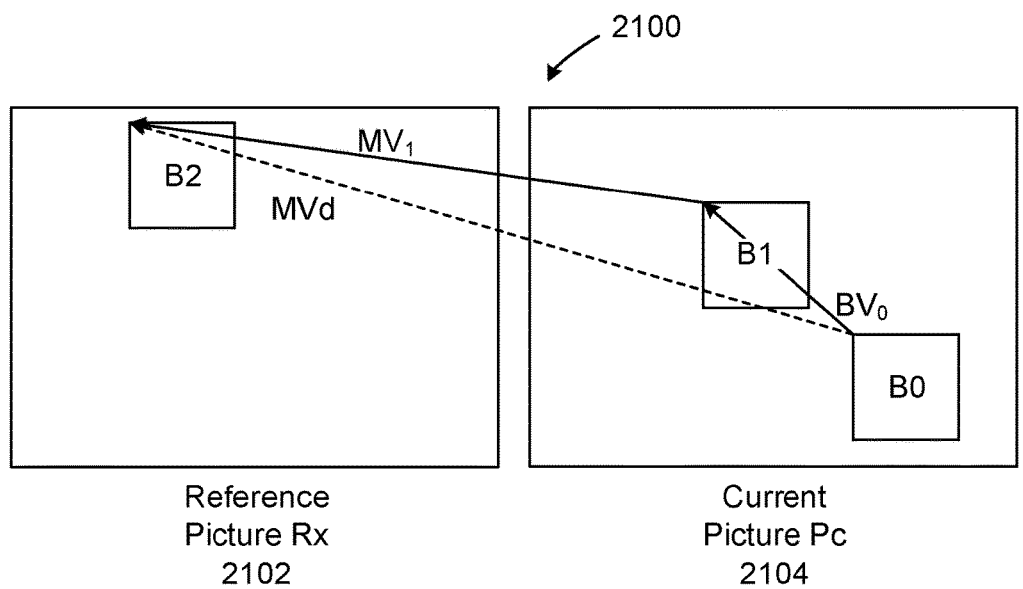
FIG. 17 is a diagram illustrating an example motion vector derivation.

FIG. 17 is a diagram illustrating an example motion vector derivation. If the block pointed to by the given BV is an inter coded block, then the motion vector can be derived. FIG. 17 shows the MV derivation case generally at 2100. If block B1 in FIG. 17 is uni-prediction mode, then the derived motion MVd in integer pixel for block B0 is $$MVd=BV0+((MV1+2)>>2) \qquad (5)$$

In some embodiments, the derived value MVd_q in quarter pixel resolution is calculated as $$MVd\_q=(BV0<<2)+MV1$$

And the reference picture the same as that of B1. In HEVC, the normal motion vector is quarter pixel precision, and the block vector is integer precision. Integer pixel motion for derived motion vector is used by way of example here. If the block B1 is bi-prediction mode, then there are two ways to perform motion vector derivation. One is to derive two motion vectors for two directions separately and reference indices the same as uni-prediction mode. Another is to select the motion vector from the reference picture with a smaller quantization parameter (higher quality). If both reference pictures have the same quantization parameter, then we may select the motion vector from the closer reference picture in picture order of count (POC) distance (higher correlation). The following discussion uses the example of using the second way to convert bi-prediction to uni-prediction to reduce the complexity.

Intra Block Copy Merge Mode.

Figure 15:
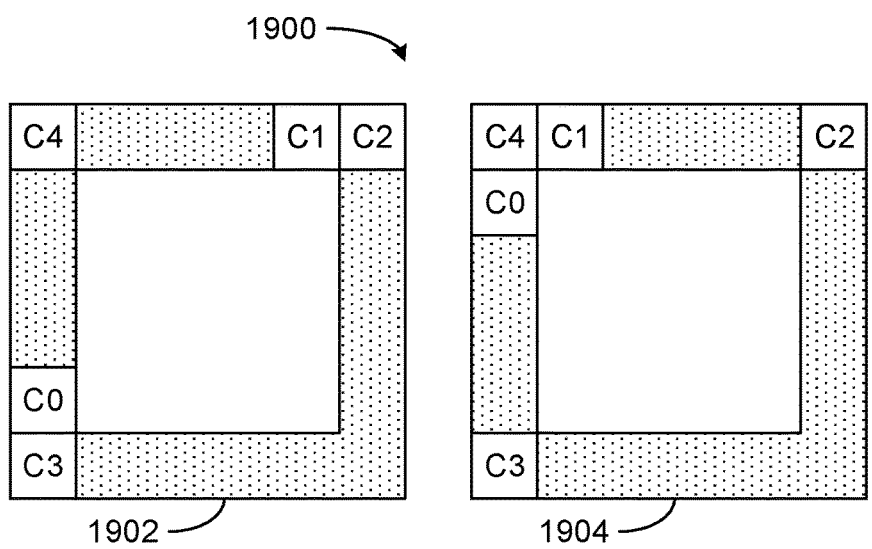
FIG. 15 is a diagram illustrating two examples of spatial candidates for intra block copy merge.

FIG. 15 is a diagram illustrating two examples of spatial candidates for intra block copy merge. In HEVC main profile [R13] and range extension [R17], inter coding unit merge mode will not signal the motion information directly, but signal an index in the inter merge candidate list to the decoder. The inter merge candidate lists will be constructed in a deterministic way the same as that in the encoder. The motion information is derived from the candidate list using the index. In the example that is numbered 1902 in FIG. 15, there are five spatial neighboring blocks and one temporal collocated block. Only those blocks coded in inter mode will be added in the inter merge candidate list. If the candidate list is not full with spatial and temporal neighboring blocks, then bi-prediction motion by combining existing merge candidates in two lists and zero motion will be appended.

For intra block copy merge mode, a similar method of applying the merge mode is carried out. No BV information is coded explicitly, but a merge candidate index is coded. In the HEVC SCC extension (SCM-1.0) [R31], the BV is coded with differential coding using the last coded BV as its predictor. In BV candidate list construction, the BV predictor is checked first. If the BV predictor is valid for the current CU, then it is added as the first merge candidate. Then, in the examples numbered 1902 and 1904 in FIG. 15, 5 spatial blocks are checked; those valid BVs are added in order if (1) the spatial neighboring block is IntraBC coded and therefore has a BV, (2) the BV is valid for the current CU (for example, the reference block pointed to by the BV is not out of picture boundary and is already coded), and (3) the BV has not appeared in the current candidate list already. If the merge candidate list is not full, then BVs are derived with those valid BVs already in the list. In one embodiment, only the derived block vector in equation (4) is considered, and the derived motion vector in equation (5) is not considered; in such examples, all of the merge candidates in the candidate list are block vectors that correspond to intra block copy modes.

For complex design, the derived motion vector from equation (5) may be mixed together and added together with block vectors to the merge candidates. Another embodiment is for each candidate block vector $BV_0$, if the $BV_d$ or $MV_d$ derived based on $BV_0$ is valid, then we will consider the candidate block as bi-prediction mode with $BV_0$ and $BV_d$/$MV_d$, where the bi-prediction is obtained by averaging a first prediction obtained by applying the block vector $BV_0$, with a second prediction obtained by applying the derived block or motion vector $BV_d$/$MV_d$.

Figure 18A:
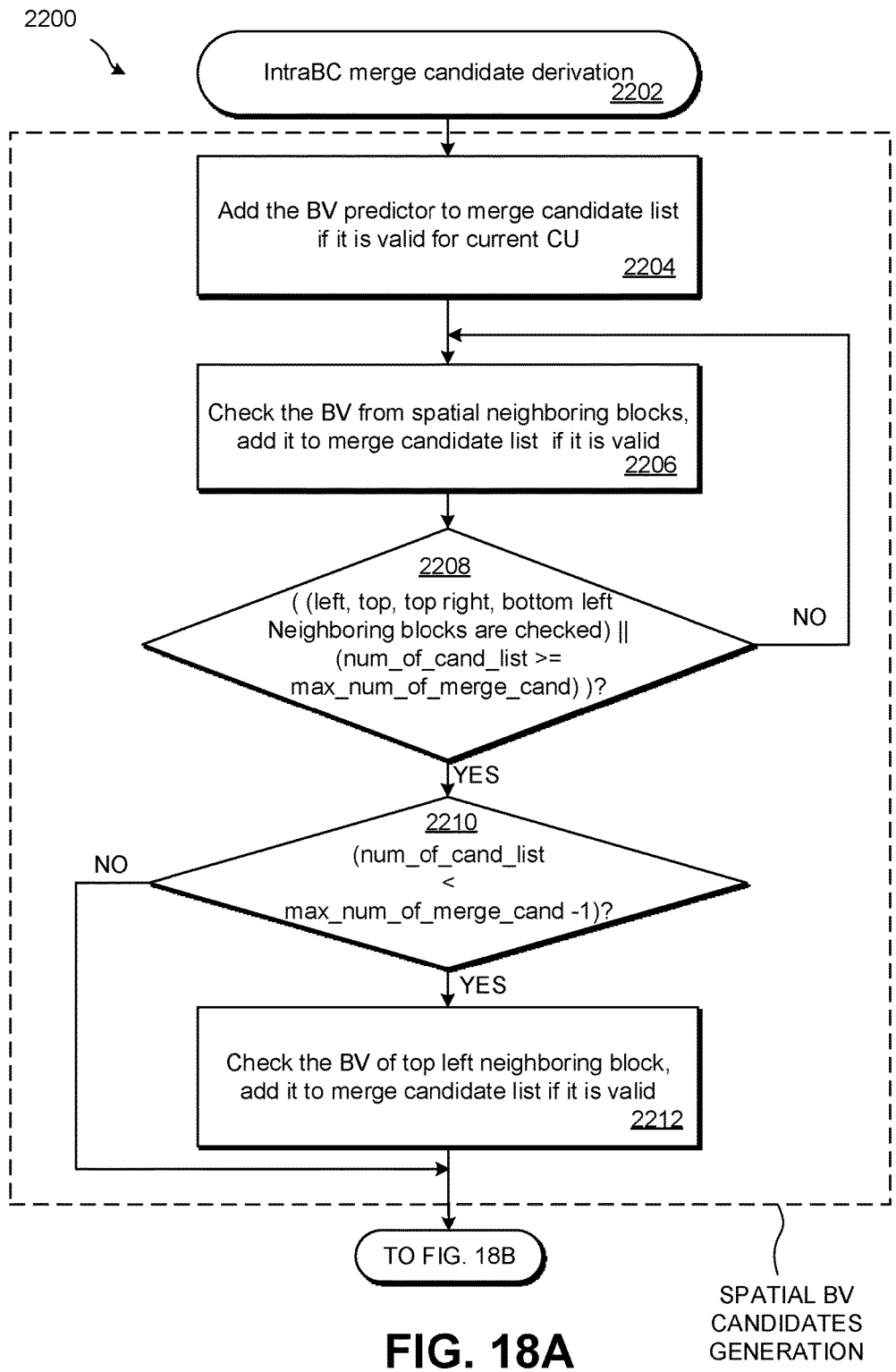
FIGS. 18A and 18B together are a flowchart of an example method.
Figure 18B:
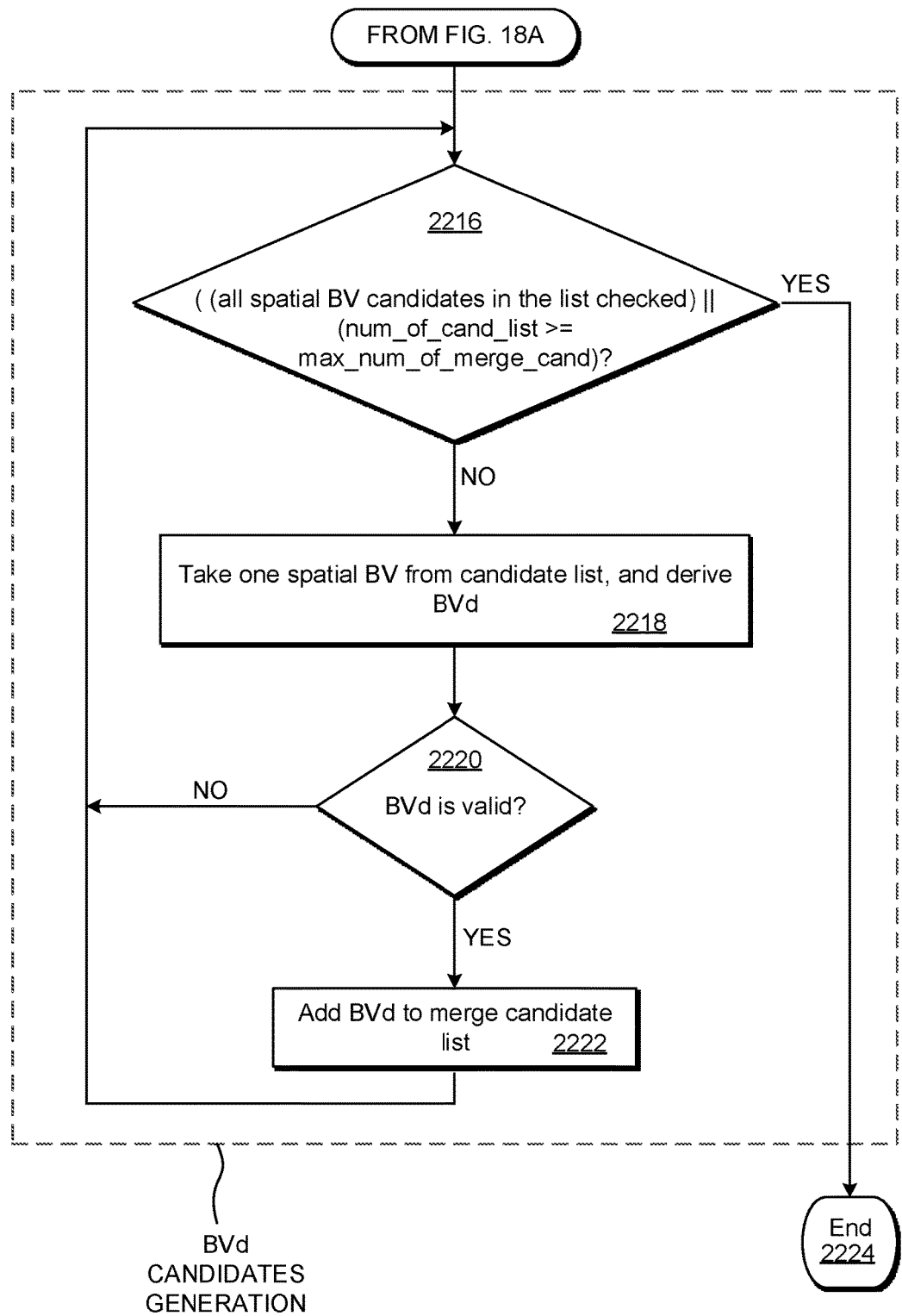

FIGS. 18A and 18B together are a flowchart of an example method of intra block copy merge candidate list construction. The example method 2200 begins at step 2202, which is "IntraBC merge candidate derivation." The method next proceeds into the dashed box that is labeled "Spatial BV Candidates Generation," and in particular to step 2204, which is "Add the BV predictor to merge candidate list if it is valid for current CU." Processing next proceeds to step 2206, which is "Check the BV from spatial neighboring blocks, add it to merge candidate list if it is valid."

The method next proceeds to a decision box 2208, where the following condition is evaluated: "((left, top, top right, bottom left Neighboring blocks are checked)|| (num_of_cand_list>=max_num_of_merge_cand))?" If the condition at 2208 is determined to be false, processing returns to step 2206.

If the condition at 2208 is instead determined to be true, processing proceeds to decision box 2210, at which the following condition is evaluated: "(num_of_cand_list<max_num_of_merge_cand-1)?" If the condition at 2210 is determined to be true, processing proceeds to step 2212, which is "Check the BV of top left neighboring block, add it to merge candidate list if it is valid." If the condition at 2210 is determined to be false, step 2212 is bypassed. Either way, processing then proceeds to FIG. 18B, into a dashed box entitled "BVd Candidates Generation," and specifically to decision box 2216, at which the following condition is evaluated: "((all spatial BV candidates in the list checked)|| (num_of_cand_list>=max_num_of_merge_cand)?"

If the condition at 2216 is determined to be true, the processing ends at 2224. If the condition at 2216 is determined to be false, processing proceeds to step 2218, which is "Take one spatial BV from candidate list, and derive BVd."

Next, processing proceeds to a decision box 2220, at which the following condition is evaluated: "BVd is valid?" If the condition at 2220 is determined to be true, processing proceeds to step 2222, which is "add BVd to merge candidate list." If the condition at 2220 is instead determined to be false, then processing returns to the decision box 2216.

Intra Block Copy Mode with Derived Block Vector.

In normal intra block copy mode, the block vector will be signaled explicitly for each prediction unit within coding unit. In some embodiments, this mode is extended by adding a flag to indicate if the signaled block vector or the derived block vector is used in IntraBC prediction. If the flag is 0, then the signaled block vector is used for IntraBC prediction and no need to apply BV derivation. If the flag is 1, then the BV or MV is derived using equation (4) or equation (5)

based on the signaled block vector, and the derived BV or MV will be used for intra block copy prediction or motion compensated prediction.

Another embodiment is to add two flags to normal IntraBC mode. The first flag is used to indicate whether the BV derivation process is applied or not. If the first flag is 1, the second flag is coded to indicate whether uni-prediction or bi-prediction is used. If second flag is 0, then only the derived BV or MV is used for intra block copy prediction or motion compensated prediction. Otherwise, if the second flag is 1, the signaled BV is used to generate the first prediction, and the derived BV or MV is used to generate the second prediction; the final prediction is generated by averaging those two predictions, analogously to bi-prediction mode.

Memory Access Bandwidth Reduction for Block Vector Derivation.

Block vector derivation operates using information regarding the block coding mode and block vector/motion vector, such as the information of block B1 in FIG. 16 and FIG. 17. For decoder chip design, there are two ways to store the mode/BV/motion information of all coded blocks. One is to store the information in external memory. This technique requires access to external memory, thus increasing memory access bandwidth. Another technique is to cache the information in on-chip memory, which increases the cache size.

Two exemplary methods are described here for reducing the amount of information required to be stored. One is to store that information with coarse granularity. In HEVC, the original BV/MV information is stored based on a 4×4 block size. The memory size will be greatly reduced by storing the original BV/MV information in compressed form based on larger block sizes, for example, in 16×16 block size. If 16×16 block size is used, the required BV storage has the same granularity as compressed motion in HEVC. In this way, it is possible to cache those data in a reasonable size. The second solution is to cache that information of coded blocks in a limited range instead of all blocks already coded. For example, the decoder may only cache the information pertaining to the current CTU row and a limited number of coded neighboring CTU rows above current CTU row. If the block B1 pointed by the first BV in FIG. 16 and FIG. 17 is outside the range that the decoder caches, then this BV will be regarded as invalid, and BV/MV derivation will not be applied.

Coding Syntax and Semantics.

New syntax elements were proposed to signal the CUs that are coded with intra block copy merge and intra block copy with derived block vector, based on the current syntax design of the HEVC range extension draft [R17]. The proposed palette coding methods discussed in this section can be signaled in the bit-stream by introducing additional syntax. The following table (Table 2) shows the proposed syntax elements, changes to that of the HEVC range extension draft [R17] are contained in the lines numbered [10], [12], [13], [14], [17], [27], [28], [29], [40], [41], and [42].

Syntax.

TABLE 2

| Syntax. | Descriptor |
|---|---|
| [01] coding_unit( x0, y0, log2CbSize ) { | |
| [02]   if( transquant_bypass_enabled_flag ) | |
| [03]     cu_transquant_bypass_flag | ae(v) |
| [04]   if( slice_type != I ) | |
| [05]     cu_skip_flag[ x0 ][ y0 ] | ae(v) |
| [06]   nCbS = ( 1 << log2CbSize ) | |
| [07]   if( cu_skip_flag[ x0 ][ y0 ] ) | |
| [08]     prediction_unit( x0, y0, nCbS, nCbS ) | |
| [09]   else { | |
| [10]     if( intra_block_copy_enabled_flag ) { | |
| [11]       intra_bc_flag[ x0 ][ y0 ] | ae(v) |
| [12]       if(intra_bc_flag[ x0 ][ y0 ]) | |
| [13]         intra_bc_merge_flag[ x0 ][ y0 ] | ae(v) |
| [14]     } | |
| [15]     if( slice_type != I && !intra_bc_flag[ x0 ][ y0 ] ) | |
| [16]       pred_mode_flag | ae(v) |
| [17]     if( CuPredMode[ x0 ][ y0 ] != MODE_INTRA \|\| (intra_bc_flag[ x0 ][ y0 ] && !intra_bc_merge_flag[ x0 ][ y0 ] ) \|\| log2CbSize = = MinCbLog2SizeY ) | |
| [18]       part_mode | ae(v) |
| [19]     if( CuPredMode[ x0 ][ y0 ] = = MODE_INTRA ) { | |
| [20]       if( PartMode = = PART_2Nx2N && pcm_enabled_flag && !intra_bc_flag[ x0 ][ y0 ] && log2CbSize >= Log2MinIpcmCbSizeY && log2CbSize <= Log2MaxIpcmCbSizeY ) | |
| [21]         pcm_flag[ x0 ][ y0 ] | ae(v) |
| [22]       if( pcm_flag[ x0 ][ y0 ] ) { | |
| [23]         while( !byte_aligned( ) ) | |
| [24]           pcm_alignment_zero_bit | f(1) |
| [25]         pcm_sample( x0, y0, log2CbSize ) | |
| [26]       } else if( intra_bc_flag[ x0 ][ y0 ] ) { | |
| [27]         if( intra_bc_merge_flag[ x0 ][ y0 ] ) | |
| [28]           intra_bc_merge_index[ x0 ][ y0 ] | ae(v) |
| [29]         if( !intra_bc_merge_flag[ x0 ][ y0 ] ) { | |
| [30]           mvd_coding( x0, y0, 2) | |
| [31]           if( PartMode = = PART_2NxN ) | |
| [32]             mvd_coding( x0, y0 + ( nCbS / 2 ), 2) | |
| [33]           else if( PartMode = = PART_Nx2N ) | |
| [34]             mvd_coding( x0 + ( nCbS / 2 ), y0, 2) | |

TABLE 2-continued

| Syntax. | Descriptor |
|---|---|
| [35]             else if( PartMode = = PART_N×N ) { | |
| [36]                 mvd_coding( x0 + ( nCbS / 2 ), y0, 2) | |
| [37]                 mvd_coding( x0, y0 + ( nCbS / 2 ), 2) | |
| [38]                 mvd_coding( x0 + ( nCbS / 2 ), y0 + ( nCbS / 2 ), 2) | |
| [39]             } | |
| [40]             if( PartMode = = PART_2N×2N ) | |
| [41]                 intra_bc_bv_derivation_flag[ x0 ][ y0 ] | ae(v) |
| [42]         } | |
| [43]     } else { | |
| [44]         pbOffset = ( PartMode = = PART_N×N ) ? ( nCbS / 2 ) : nCbS | |
| [45]         for( j = 0; j < nCbS; j = j + pbOffset ) | |
| [46]             for( i = 0; i < nCbS; i = i + pbOffset ) | |
| [47]                 prev_intra_luma_pred_flag[ x0 + i ][ y0 + j ] | ae(v) |
| [48]         for( j = 0; j < nCbS; j = j + pbOffset ) | |
| [49]             for( i = 0; i < nCbS; i = i + pbOffset ) | |
| [50]                 if( prev_intra_luma_pred_flag[ x0 + i ][ y0 + j ] ) | |
| [51]                     mpm_idx[ x0 + i ][ y0 + j ] | ae(v) |
| [52]                 else | |
| [53]                     rem_intra_luma_pred_mode[ x0 + i ][ y0 + j ] | ae(v) |
| [54]         if( ChromaArrayType = = 3 ) | |
| [55]             for( j = 0; j < nCbS; j = j + pbOffset ) | |
| [56]                 for( i = 0; i < nCbS; i = i + pbOffset ) | |
| [57]                     intra_chroma_pred_mode[ x0 + i ][ y0 + j ] | ae(v) |
| [58]         else if( ChromaArrayType != 0 ) | |
| [59]             intra_chroma_pred_mode[ x0 ][ y0 ] | ae(v) |
| [60]     } | |
| [61] } else { | |
| [62]     if( PartMode = = PART_2N×2N ) | |
| [63]         prediction_unit( x0, y0, nCbS, nCbS ) | |
| [64]     else if( PartMode = = PART_2N×N ) { | |
| [65]         prediction_unit( x0, y0, nCbS, nCbS / 2 ) | |
| [66]         prediction_unit( x0, y0 + ( nCbS / 2 ), nCbS, nCbS / 2 ) | |
| [67]     } else if( PartMode = = PART_N×2N ) { | |
| [68]         prediction_unit( x0, y0, nCbS / 2, nCbS ) | |
| [69]         prediction_unit( x0 + ( nCbS / 2 ), y0, nCbS / 2, nCbS ) | |
| [70]     } else if( PartMode = = PART_2N×nU ) { | |
| [71]         prediction_unit( x0, y0, nCbS, nCbS / 4 ) | |
| [72]         prediction_unit( x0, y0 + ( nCbS / 4 ), nCbS, nCbS * 3 / 4 ) | |
| [73]     } else if( PartMode = = PART_2N×nD ) { | |
| [74]         prediction_unit( x0, y0, nCbS, nCbS * 3 / 4 ) | |
| [75]         prediction_unit( x0, y0 + ( nCbS * 3 / 4 ), nCbS, nCbS / 4 ) | |
| [76]     } else if( PartMode = = PART_nL×2N ) { | |
| [77]         prediction_unit( x0, y0, nCbS / 4, nCbS ) | |
| [78]         prediction_unit( x0 + ( nCbS / 4 ), y0, nCbS * 3 / 4, nCbS ) | |
| [79]     } else if( PartMode = = PART_nR×2N ) { | |
| [80]         prediction_unit( x0, y0, nCbS * 3 / 4, nCbS ) | |
| [81]         prediction_unit( x0 + ( nCbS * 3 / 4 ), y0, nCbS / 4, nCbS ) | |
| [82]     } else { /* PART_N×N */ | |
| [83]         prediction_unit( x0, y0, nCbS / 2, nCbS / 2 ) | |
| [84]         prediction_unit( x0 + ( nCbS / 2 ), y0, nCbS / 2, nCbS / 2 ) | |
| [85]         prediction_unit( x0, y0 + ( nCbS / 2 ), nCbS / 2, nCbS / 2 ) | |
| [86]         prediction_unit( x0 + ( nCbS / 2 ), y0 + ( nCbS / 2 ), nCbS / 2, nCbS / 2 ) | |
| [87]     } | |
| [88] } | |
| [89] if( !pcm_flag[ x0 ][ y0 ] ) { | |
| [90]     if( CuPredMode[ x0 ][ y0 ] != MODE_INTRA && !( PartMode = = PART_2N×2N && merge_flag[ x0 ][ y0 ] ) \|\| ( CuPredMode[ x0 ][ y0 ] = = MODE_INTRA && intra_bc_flag[ x0 ][ y0 ] ) ) | |
| [91]         rqt_root_cbf | ae(v) |
| [92]     if( rqt_root_cbf ) { | |
| [93]         MaxTrafoDepth = ( CuPredMode[ x0 ][ y0 ] = = MODE_INTRA ? ( max_transform_hierarchy_depth_intra + IntraSplitFlag ) : max_transform_hierarchy_depth_inter ) | |
| [94]         transform_tree( x0, y0, x0, y0, log2CbSize, 0, 0 ) | |
| [95]     } | |
| [96] } | |
| [97] } | |
| [98] } | |

With respect to Table 2, the following is noted:

intra_bc_merge_flag[x0] [y0] equal to 1 specifies that the current coding unit is coded in merge mode, and the block vector is selected from the merge candidates. intra_bc_merge_flag[x0] [y0] equal to 0 specifies that the coding unit is not coded in merge mode, and the block vector of current coding unit is coded explicitly. When not present, the value of intra_bc_merge_flag is inferred to be equal to 0. The array indices x0, y0 specify the location (x0, y0) of the top-left luma sample of the considered coding block relative to the top-left luma sample of the picture.

intra_bc_merge_index[x0] [y0] specifies the index among merge candidates that the block vector of current coding unit is the same as. intra_bc_merge_index[x0] [y0] shall be in the range of 0 to maximal number of intra block copying merge candidates minus 1. The array indices x0, y0 specify the location (x0, y0) of the top-left luma sample of the considered coding block relative to the top-left luma sample of the picture.

intra_bc_bv_derivation_flag[x0] [y0] equal to 1 specifies that the derived BV or MV is used for current PU prediction.

Further Exemplary Embodiments

In an exemplary embodiment, a derived block vector is generated, and the derived block vector is used as a merge candidate in an intra block-copy merge mode. In some such methods, the derived block vector, BVd, is determined according to BVd=BV0+BV1, given block vector BV0.

In another exemplary embodiment, a derived motion vector is generated, and the derived motion vector is used as a merge candidate in an intra block-copy merge mode. In some such methods, the derived motion vector in integer pixel units, MVd, is determined according to MVd=BV0+((MV1+2)>>2), given block vector BV0.

In an exemplary embodiment, a derived block vector is generated, and the derived block vector is used for normal IntraBC prediction with intra block copy method.

In another exemplary embodiment, a derived motion vector is generated, and the derived motion vector is used for normal IntraBC prediction with motion compensation prediction method.

In an exemplary embodiment, a block vector (BV) candidate list is formed. Derived BVs (BVds) are generated, and the BVds are added to the candidate list.

In some such embodiments, the formation of the BV candidate list includes: adding the BV predictor if the BV predictor is valid for a current coding unit (CU), and checking five spatial blocks and adding those respective spatial block BVs that are valid. In some such embodiments, the spatial block BVs are added only if (i) the spatial neighboring block is IntraBC coded, (ii) the BV is valid for the current CU and (iii) the BV has not appeared in the current candidate list already. In some such embodiments, the BVds are generated only if the merge candidate list is not full. The BVds may be checked for validity prior to being added to the candidate list. In some embodiments, the BVds that are generated are only derived according to BVd=BV0+BV1. In some such methods, derived motion vectors (MVds) are generated, and the MVds are added to the candidate list. In some embodiments, the BVds are derived according to both (i) BVd=BV0+BV1 and (ii) MVd=BV0+((MV1+2)>>2). In some embodiments, a candidate block is treated as bi-prediction mode with $BV_0$ and $BV_d/MV_d$. A bi-prediction may first be obtained by averaging a first prediction obtained by applying a block vector $BV_0$, with a second prediction obtained by applying a block or motion vector $BV_d/MV_d$.

In an exemplary embodiment, a video coded bitstream is received, and flag is identified in the bitstream indicating whether a signaled block vector or a derived block vector is used in IntraBC prediction. If the flag is a first value, then the signaled block vector is used for IntraBC prediction. If the flag is a second value then the BV or MV is derived based on the signaled block vector. In some such methods, the derived BV or MV is used for intra block copy prediction or motion compensated prediction.

In another exemplary embodiment, a coded video bitstream is received. A first flag in the bitstream is identified as indicating whether a signaled block vector or a derived block vector is used in IntraBC prediction. A second flag in the bitstream is identified as indicating whether uni-prediction or bi-prediction is used.

In some such embodiments, if the first flag is 1, and the second flag is 0, then only derived BV/MV is used for intra block copy prediction or motion compensated prediction. If the first flag is 1 and the second flag is 1, the signaled BV is used to generate the first prediction, and the derived BV/MV is used to generate the second prediction, and the final prediction is generated by averaging those two predictions.

In an exemplary embodiment, original BV/MV information is compressed by storing the BV/MV information based on larger block sizes. The larger block size may be, for example, a 16×16 block size.

In another exemplary embodiment, a decoder is used to cache information of coded blocks in a limited range that is less than all blocks already coded. In some such methods, the decoder only caches information of a current CTU row and a predetermined number of coded neighboring CTU rows above the current CTU row.

In an exemplary embodiment, a video coding method of deriving predictive vector is provided. The method includes identifying a first candidate block vector for prediction of a video block, wherein the first candidate block vector points to a first candidate block. At least a first predictive vector associated with the first candidate block is identified. A derived predictive vector is generated from the first candidate block vector and the first predictive vector, and the video block is coded using the derived predictive vector. In some embodiments, the coding of the video block using the derived predictive vector includes identifying a second candidate block that the derived predictive vector points to and predicting the video block using the second candidate block.

In some embodiments, coding the video block includes signaling the first candidate block vector in a bit stream. In some embodiments, coding the video block further includes signaling the first predictive vector in the bit stream. In some embodiments, coding the video block further includes signaling a flag in the bit stream, wherein a first value of the flag indicates that the derived predictive vector is used to code the video block and wherein a second value of the flag indicates that the first candidate block vector is used to code the video block. In some embodiments, encoding the input video block in the bit stream includes encoding in the bit stream an index identifying the derived predictive vector in a merge candidate list.

The derived predictive vector is generated in some embodiments by adding the first candidate block vector and the first predictive vector. Where the first candidate block vector and the first predictive vector have different precisions, the adding of the first block vector and the first predictive vector may be performed after aligning them to the same precision.

In some embodiments the video coding method further includes generating a merge candidate list and inserting the derived predictive vector into the merge candidate list. In some such embodiments, a determination is made of whether the derived predictive vector is valid, and the derived predictive vector is inserted into the merge candidate list only after determining that the derived predictive vector is valid. Coding the video block using the derived predictive vector includes providing an index identifying the derived predictive vector in the merge candidate list. The determination of whether the derived predictive vector is valid includes, in some embodiments, identifying a second candidate block that the derived predictive vector points to, determining whether all samples in the second candidate block are available. The derived predictive vector is determined to be valid if all samples in the second candidate block are available. The derived predictive vector is determined not to be valid if at least one sample in the second candidate block is not available. In some embodiments, a sample in the second candidate block is unavailable if any of the following is true: the sample is not yet coded, or the sample is in a different slice or in a different tile, or the sample is out of a video picture boundary.

In an exemplary embodiment, a method is provided of decoding a coded video block from a bit stream encoding a video. At least a first candidate block vector is identified for prediction of the input video block, wherein the first candidate block vector points to a first candidate block. At least a first predictive vector associated with the first candidate block is identified. A derived predictive vector is generated from the first block vector and the first predictive vector, and the coded video block is decoded using the derived predictive vector. In some such embodiments, identification of a first candidate block vector includes receiving the first candidate block vector signaled in the bit stream.

In some such embodiments, decoding of the coded video block using the derived predictive vector is performed in response to receiving a flag in the bit stream indicating that the input video block is encoded with a derived predictive vector.

In some embodiments, identification of a first candidate block vector includes identification of a first block vector merge candidate. In some embodiments, the derived predictive vector is a derived predictive vector merge candidate, and decoding the coded video block using the derived predictive vector merge candidate is performed in response to receiving an index in the bit stream identifying the derived predictive vector merge candidate.

In an exemplary embodiment, a video encoding method is provided for generating a bit stream encoding a video including an input video block. A neighboring block of the input video block is identified. The neighboring block may be, for example, the left, top, or top-left neighbor of the input video block. A first block vector associated with the neighboring block is identified, where the first block vector points to a first candidate block. A second block vector associated with the first candidate block is identified. A derived block vector is generated by adding the first block vector and the second block vector, and a first prediction block is generated for prediction of the input video block using the derived block vector.

In some such embodiments, the encoding of the input video block further includes generating at least a second prediction block for prediction of the input video block using a third block vector. The first prediction block and the second prediction block are compared, and the prediction block and its associated block vector are selected based on an encoding metric. The encoding metric may be, for example, a Lagrangian rate-distortion cost.

In an exemplary embodiment, a video encoder is provided for generating a bit stream to encode a video that includes an input video block. The encoder including a processor and a non-transitory storage medium storing instructions operative, when executed on the processor, to perform functions including: identifying at least a first candidate block vector for prediction of the input video block, wherein the first candidate block vector points to a first candidate block; identifying a first predictive vector used to encode the first candidate block; generating a derived predictive vector from the first candidate block vector and the first predictive vector; and encoding the input video block in the bit stream using the derived predictive vector for prediction of the input video block.

In an exemplary embodiment, a video encoder is provided for generating a bit stream encoding a video including an input video block. The encoder includes a processor and a non-transitory storage medium storing instructions operative, when executed on the processor, to perform functions including: identifying at least a first block vector merge candidate for encoding of the input video block; identifying a first predictive vector used to encode the first candidate block; generating a derived predictive vector from the first block vector merge candidate and the first predictive vector; inserting the derived predictive vector in a merge candidate list; from the merge candidate list, choosing a selected predictive vector for prediction of the input video block; and encoding the input video block in the bit stream using the selected predictive vector for prediction of the input video block.

In an exemplary embodiment, a video decoder is provided for decoding a coded video block from a bit stream encoding a video, the decoder including a processor and a non-transitory storage medium storing instructions operative, when executed on the processor, to perform functions including: identifying at least a first block vector for decoding of the coded video block; identifying a first predictive vector used to encode the first block vector; generating a derived predictive vector from the first block vector and the first predictive vector; and decoding the coded video block using the derived predictive vector for prediction of the coded video block.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

REFERENCES

[R1] ITU-T Q6/16 and ISO/IEC JCT1/SC29/WG11, "Joint Call for Proposals for Coding of Screen Content", MPEG2014/N14175, January 2014, San Jose, USA.

[R2] J. Chen, Y. Chen, T. Hsieh, R. Joshi, M. Karczewicz, W.-S. Kim, X. Li, C. Pang, W. Pu, K. Rapaka, J. Sole, L. Zhang, F. Zou, "Description of screen content coding technology proposal by Qualcomm", JCTVC-Q0031, March 2014, Valencia, ES.

[R3] C.-C. Chen, T.-S. Chang, R.-L. Liao, C.-W. Kuo, W.-H. Peng, H.-M. Hang, Y.-J. Chang, C.-H. Hung, C.-C. Lin, J.-S. Tu, E.-C. Ke, J.-Y. Kao, C.-L. Lin, F.-D. Jou, F.-C. Chen, "Description of screen content coding technology proposal by NCTU and ITRI International", JCTVC-Q0032, March 2014, Valencia, ES.

[R4] P. Lai, T.-D. Chuang, Y.-C. Sun, X. Xu, J. Ye, S.-T. Hsiang, Y.-W. Chen, K. Zhang, X. Zhang, S. Liu, Y.-W. Huang, S. Lei, "Description of screen content coding technology proposal by MediaTek", JCTVC-Q0033, March 2014, Valencia, ES.

[R5] Z. Ma, W. Wang, M. Xu, X. Wang, H. Yu, "Description of screen content coding technology proposal by Huawei Technologies", JCTVC-Q0034, March 2014, Valencia, ES.

[R6] B. Li, J. Xu, F. Wu, X. Guo, G. J. Sullivan, "Description of screen content coding technology proposal by Microsoft", JCTVC-Q0035, March 2014, Valencia, ES.

[R7] R. Cohen, A. Minezawa, X. Zhang, K. Miyazawa, A. Vetro, S. Sekiguchi, K. Sugimoto, T. Murakami, "Description of screen content coding technology proposal by Mitsubishi Electric Corporation", JCTVC-Q0036, March 2014, Valencia, ES.

[R8] X. Xiu, C.-M. Tsai, Y. He, Y. Ye, "Description of screen content coding technology proposal by InterDigital", JCTVC-Q0037, March 2014, Valencia, ES.

[R9] T. Lin, S. Wang, P. Zhang, and K. Zhou, "AHG8: P2M based dual-coder extension of HEVC", Document no JCTVC-L0303, January 2013.

[R10] X. Guo, B. Li, J.-Z. Xu, Y. Lu, S. Li, and F. Wu, "AHG8: Major-color-based screen content coding", Document no JCTVC-O0182, October 2013.

[R11] L. Guo, M. Karczewicz, J. Sole, and R. Joshi, "Evaluation of Palette Mode Coding on HM-12.0+RExt-4.1", JCTVC-O0218, October 2013.

[R12] C. Pang, J. Sole, L. Guo, M. Karczewicz, and R. Joshi, "Non-RCE3: Intra Motion Compensation with 2-D MVs", JCTVC-N0256, July 2013.

[R13] B. Bross, W-J. Han, G. J. Sullivan, J-R. Ohm, T. Wiegand, "High Efficiency Video Coding (HEVC) Text Specification Draft 10", JCTVC-L1003. January 2013.

[R14] G. J. Sullivan and T. Wiegand, Rate-distortion optimization for video compression. IEEE Signal Processing Magazine, vol. 15, issue 6, November 1998.

[R15] T. Vermeir, "Use cases and requirements for lossless and screen content coding", JCTVC-M0172, April 2013, Incheon, KR.

[R16] J. Sole, R. Joshi, M. Karczewicz, "AhG8: Requirements for wireless display applications", JCTVC-M0315, April 2013, Incheon, KR.

[R17] D. Flynn, M. Naccari, K. Sharman, C. Rosewarne, J. Sole, G. J. Sullivan, T. Suzuki, "HEVC Range Extension Draft 6", JCTVC-P1005, January 2014, San Jose.

[R18] J. Sole, S. Liu, "HEVC Screen Content Coding Core Experiment 1 (SCCE1): Intra Block Copying Extensions", JCTVC-Q1121, March 2014, Valencia.

[R19] C.-C. Chen, X. Xu, L. Zhang, "HEVC Screen Content Coding Core Experiment 2 (SCCE2): Line-based Intra Copy", JCTVC-Q1122, March 2014, Valencia.

[R20] Y.-W. Huang, P. Onno, R. Joshi, R. Cohen, X. Xiu, Z. Ma, "HEVC Screen Content Coding Core Experiment 3 (SCCE3): Palette mode", JCTVC-Q1123, March 2014, Valencia.

[R21] Y. Chen, J. Xu, "HEVC Screen Content Coding Core Experiment 4 (SCCE4): String matching for sample coding", JCTVC-Q1124, March 2014, Valencia.

[R22] X. Xiu, J. Chen, "HEVC Screen Content Coding Core Experiment 5 (SCCE5): Inter-component prediction and adaptive color transforms", JCTVC-Q1125, March 2014, Valencia.

[R23] P. Onno, G. Laroche, T. Poirier, C. Gisquet, "AhG5: On the displacement vector prediction scheme for Intra Block Copy", JCTVC-Q0062, March 2014, Valencia.

[R24] X. Zhang, K. Zhang, J. An, H. Huang, S. Lei, "Block vector prediction for intra block copy", JCTVC-Q0080, March 2014, Valencia.

[R25] K. Zhang, J. An, X. Zhang, H. Huang, S. Lei, "Symmetric intra block copy", JCTVC-Q0082, March 2014, Valencia.

[R26] S.-T. Hsiang, T.-D. Chuang, S. Lei, "AHG8; Coding the prediction differences of the intra BC vectors", JCTVC-Q0095, March 2014, Valencia.

[R27] C. Pang, J. Sole, R. Joshi, M. Karczewicz, "Block vector prediction method for intra block copy", JCTVC-Q0114, March 2014, Valencia.

[R28] L. Zhu, J. Xu, G. J. Sullivan, Y. Wu, S. Sankuratri, B. A. Kumar, "Ping-pong block vector predictor for intra block copy", JCTVC-Q0134, March 2014, Valencia.

[R29] B. Li, J. Xu, "Hash-based intraBC search", JCTVC-Q0252, March 2014, Valencia.

[R30] C. Pang, J. Sole, T. Hsieh, M. Karczewicz, "Intra block copy with larger search region", JCTVC-Q0139, March 2014, Valencia.

[R31] R. Joshi, J. Xu, R. Cohen, S. Liu, Z. Ma, Y. Ye, "Screen content coding test model 1 (SCM 1)", JCTVC-Q1014, March 2014, Valencia.

What is claimed is:

1. A system comprising a processor and a non-transitory computer-readable medium storing instructions operative to perform functions comprising:
   identifying a first candidate block vector for prediction of a video block, wherein the first candidate block vector points to a first candidate block;
   identifying at least a first predictive vector associated with the first candidate block;
   generating a derived predictive vector from the first candidate block vector and the first predictive vector; and
   coding the video block using the derived predictive vector.

2. The system of claim 1, wherein coding the video block using the derived predictive vector includes:
   identifying a second candidate block that the derived predictive vector points to; and
   predicting the video block using the second candidate block.

3. The system of claim 1, wherein coding the video block includes signaling the first candidate block vector in a bit stream.

4. The system of claim 3, wherein the instructions are further operative to perform the function of signaling the first predictive vector in the bit stream.

5. The system of claim 3, wherein the instructions are further operative to perform the function of signaling a flag in the bit stream, wherein a first value of the flag indicates that the derived predictive vector is used to code the video block.

6. The system of claim 5, wherein a second value of the flag indicates that the first candidate block vector is used to code the video block.

7. The system of claim 1, wherein the derived predictive vector is generated by adding the first candidate block vector and the first predictive vector.

8. The system of claim 7, wherein the first candidate block vector and the first predictive vector have different precisions, and wherein adding the first block vector and the first predictive vector is performed after aligning them to the same precision.

9. The system of claim 1, wherein the first predictive vector is a second block vector, and the derived predictive vector is a derived block vector.

10. The system of claim 9, wherein the derived block vector is generated by adding the first candidate block vector and the second block vector.

11. The system of claim 1, wherein the first predictive vector is a first motion vector, and the derived predictive vector is a derived motion vector.

12. The system of claim 11, wherein the derived motion vector is generated by adding the first candidate block vector and the first motion vector.

13. The system of claim 12, wherein the first candidate block vector and the first motion vector have different precisions, and wherein the derived motion vector is generated by aligning the precision of the first candidate block vector and the first motion vector and adding the precision aligned first candidate block vector and the precision aligned first motion vector.

14. The system of claim 13, wherein the precision aligned first candidate block vector and the precision aligned first motion vector are added according to the equation $$MVd = BV0 + ((MV1+2) >> 2),$$

where BV0 is the first candidate block vector, MV1 is the first motion vector, and MVd is the derived motion vector.

15. The system of claim 1, wherein the instructions are further operative to perform the function of inserting the derived predictive vector into a merge candidate list.

16. The system of claim 15, wherein the instructions are further operative to perform the function of determining whether the derived predictive vector is valid, wherein the derived predictive vector is inserted into the merge candidate list only after determining that the derived predictive vector is valid.

17. The system of claim 16, wherein determining whether the derived predictive vector is valid comprises:
identifying a second candidate block that the derived predictive vector points to;
determining whether all samples in the second candidate block are available; and
determining that the derived predictive vector is valid if all samples in the second candidate block are available, and determining that the derived predictive vector is not valid if at least one sample in the second candidate block is not available.

18. The system of claim 17, wherein a sample in the second candidate block is unavailable if any of the following is true:
the sample is not yet coded, or
the sample is in a different slice or in a different tile, or
the sample is out of a video picture boundary.

19. The system of claim 15, wherein coding the video block using the derived predictive vector includes providing an index identifying the derived predictive vector in the merge candidate list.

20. A decoder operative to decode a coded video block from a bit stream encoding a video, the decoder comprising a processor and a non-transitory computer-readable medium storing instructions operative to perform functions comprising:
identifying at least a first candidate block vector for prediction of the coded video block, wherein the first candidate block vector points to a first candidate block;
identifying at least a first predictive vector associated with the first candidate block;
generating a derived predictive vector from the first candidate block vector and the first predictive vector; and
decoding the coded video block using the derived predictive vector.

21. The video decoder of claim 20, wherein decoding the video block using the derived predictive vector includes:
identifying a second candidate block that the derived predictive vector points to; and
predicting the video block using the second candidate block.

22. The video decoder of claim 20, wherein the decoder is further operative to decode information signaling the first candidate block vector from the bit stream.

23. The video decoder of claim 22, wherein the decoder is further operative to decode a flag signaled in the bit stream, and wherein a first value of the flag indicates that the derived predictive vector is used to code the video block.

24. The video decoder of claim 20, wherein the derived predictive vector is generated by adding the first candidate block vector and the first predictive vector.

25. The video decoder of claim 20, wherein the decoder is further operative to perform the function of inserting the derived predictive vector into a merge candidate list.

26. The system of claim 1, wherein the system is a decoder.

* * * * *